United States Patent
Bannasch et al.

(10) Patent No.: US 6,628,724 B2
(45) Date of Patent: Sep. 30, 2003

(54) PROCESS AND SYSTEM FOR INFORMATION TRANSFER

(75) Inventors: Rudolf Bannasch, Berlin (DE); Konstantin Kebkal, Berlin (DE)

(73) Assignee: Evologics GmbH, Berlin (DE)

( * ) Notice: Subject to any disclaimer, the term of this patent is extended or adjusted under 35 U.S.C. 154(b) by 106 days.

(21) Appl. No.: 09/789,321

(22) Filed: Feb. 21, 2001

(65) Prior Publication Data

US 2001/0055352 A1 Dec. 27, 2001

Related U.S. Application Data

(63) Continuation of application No. PCT/DE99/02628, filed on Aug. 23, 1999.

(30) Foreign Application Priority Data

Aug. 21, 1998 (DE) .......................................... 198 38 060
Feb. 5, 1999 (DE) .......................................... 199 04 747
Jun. 7, 1999 (DE) .......................................... 199 27 040

(51) Int. Cl.$^7$ .............................................. H04L 27/00
(52) U.S. Cl. ..................................................... 375/259
(58) Field of Search ................................. 375/146, 147, 375/219, 148, 260, 269, 272, 273, 275, 278, 284, 285, 295, 296, 303, 316, 323, 329, 334, 340, 348, 349; 455/10, 42, 501, 63, 110, 112, 113, 182.1, 205; 370/320, 335, 342, 350, 441, 516, 525, 526

(56) References Cited

U.S. PATENT DOCUMENTS

| | | | |
|---|---|---|---|
| 4,020,449 A | 4/1977 | Ito et al. | |
| 4,037,159 A | 7/1977 | Martin | |
| 4,912,422 A * | 3/1990 | Kobayashi et al. | 329/306 |
| 5,077,531 A * | 12/1991 | Takeuchi et al. | 329/304 |
| 5,105,294 A | 4/1992 | Degura et al. | |
| 5,113,278 A | 5/1992 | Degura et al. | |
| 5,124,955 A | 6/1992 | Jackson et al. | |
| 5,422,913 A | 6/1995 | Wilkinson | |
| 5,568,509 A * | 10/1996 | Hershey et al. | 375/130 |
| 6,005,876 A * | 12/1999 | Cimini et al. | 370/525 |
| 6,014,407 A * | 1/2000 | Hunsinger et al. | 375/140 |
| 6,047,023 A | 4/2000 | Arnstein | |
| 6,282,246 B1 * | 8/2001 | Kaku et al. | 375/275 |
| 6,473,453 B1 * | 10/2002 | Wilkinson | 375/143 |

FOREIGN PATENT DOCUMENTS

| | | |
|---|---|---|
| EP | 0526 704 | 5/1992 |
| WO | WO/95/10144 | 4/1995 |
| WO | WO/98/20625 | 5/1998 |
| WO | WO/99/29058 | 6/1999 |

* cited by examiner

Primary Examiner—Chi Pham
Assistant Examiner—Khanh Cong Tran
(74) Attorney, Agent, or Firm—Piper Rudnick LLP

(57) ABSTRACT

A process and system for the transfer of information, which is suitable in particular for digital information transfer. At least one information signal is created, consisting of at least one reference component and at least one information component, wherein at least one of these components has a temporally continuous frequency change during the transfer and, in addition, the reference component and the information component form discrete states for the provision of bit patterns. After receiving, the at least one component with frequency change is transferred into constant intermediate frequencies. From the spectrum of the constant intermediate frequencies, in each case the best-suited signal components are selected, separated as constant frequencies from interference portions and evaluated with regard to the relevant information parameters. This allows a signal transfer with high quality and high transfer rate, even over great distances, for example, under water. Furthermore, a suitable evaluation system is described.

33 Claims, 20 Drawing Sheets

To parameter analysis

PROCESS AND SYSTEM FOR INFORMATION TRANSFER

RELATED APPLICATION

This is a continuation of International Application No. PCT/DE99/02628, with an international filing date of Aug. 23, 1999, which is based on German Patent Application Nos. DE 198 38 060.7, filed Aug. 21, 1998, DE 199 04 747.2, filed Feb. 5, 1999, and DE 199 27 040.6, filed Jun. 7, 1999.

BACKGROUND OF THE INVENTION

1. Field of the Invention

The present invention relates to a process for the transfer of information and a suitable system therefor.

2. Description of Related Art

In many sectors of technology waves are used for the transfer of information. These may be electromagnetic or acoustic waves, for example, which are disseminated either in a special conductor or freely in a given transfer medium, and in this way pass from the transmitter or transmission unit to the receiver or reception unit. With analog information transfer, the values which are to be transferred are formed into a stepless continuous spectrum of physical states. This occurs typically in the form of an amplitude, frequency, and/or phase modulation of the carrier waves. This enables very large volumes of information to be transferred in a given interval of time. With digital information transfer, by contrast, there is a restriction to specific discrete states. With regard to the transfer rate, however, if electromagnetic waves are being used, there have still been no restrictions encountered in practice hitherto, since the frequencies of the carrier waves concerned are very high, and different digital states can be realised in extremely short spaces of time.

In some transfer media, however, such as water for example, information transfer by electromagnetic waves is only possible to a limited degree, since these have only a short range. Accordingly, in this situation the use of sound waves for the transfer of information is a possibility, which can often be propagated over substantially greater distances. These sound waves, however, are mechanical pressure waves, which, apart from the substantially lower frequency, which naturally has an effect on the transferable information rate, also differ in respect of general propagation. Their propagation speed, for example, depends very much on the particular ambient conditions.

The wide range of problems which can arise with acoustic information transfer, can be illustrated briefly by the example of the transfer of sound signals under water. With the propagation in space of the sound waves emanating from a transmitter, a part of the waves may be reflected from the water surface and/or from the bed of the body of water, depending on the depth, from various objects, particles in suspension, and even from layered inhomogeneities in the water, or bent by them. The various different components of sound waves will then arrive at the receiver with differing amplitude and phase relationship, depending on the length of run, angle relationships, and acoustic properties of the relevant limit surfaces or media. As a consequence of the interference, the actual signal at the reception point may be amplified, weakened, distorted, or even totally deleted, in an unforeseeable manner, or reception may also be distorted by what is referred to as reverberation.

To explain the problems in greater detail, the simple situation will first be considered in which only a very short signal of a specific frequency, referred to as a CWP (Continuous Wave Pulse) is transmitted. In this situation (so-called Multipath Propagation), a receiver can obtain not only an individual signal, but a whole group of temporally-displaced individual pulses of different strengths. This effect is referred to as "channel response". While in this case it is still possible for the individual pulses to be distinguished on the receiver side, and, for example, the most suitable pulse to be selected as the "actual signal" (whereupon the other pulses can, as a consequence, be regarded as "interference signals" and treated accordingly), a separation of this nature in the transmission of a longer wave package cannot normally be effected any longer, since the receiver receives only a summary or composed signal, which may indeed still have the same frequency as the initial signal, but in which the actual signal and the interference signals, with their different amplitudes and phase positions, are overlaid in such a way that unforeseeable fluctuations in the amplitude and also in the phase location may arise. This undesirable effect, which renders the evaluation of the signal difficult or can even, under certain circumstances, make this impossible, is referred to as "Intersymbol Interaction" (ISI). If transmitter and receiver move relative to one another, an additional problem may arise in the form of frequency shifts as a result of Doppler effects.

This wealth of problems makes underwater communications very difficult, such as by means of ultrasonics between divers and/or underwater vehicles, as well as the remote control of underwater equipment. Hitherto, analog information transfer in particular has only been practicable to a very limited degree. It was and is, however, still frequently used for the transfer of speech, whereby use is made of the fact that human beings can identify known words and sense associations even in cases of reception subject to very heavy noise interference. By appropriate practice and agreement on a restricted vocabulary, the identification rate can be somewhat improved. This process is not suitable, however, for transferring, for example, computer data or other information by mechanical means. Accordingly, in the acoustic information transfer sector too, suitable digital processes are being sought.

Today's technical digital systems, especially for underwater use, are based mostly on the sequential transfer of sound signals of consistent height, which are located in a more or less narrow frequency band.

A further development represents broad band procedures (see e.g. U.S. Pat. No. 5,124,955) using a plurality (100) of parallel frequency channels. For reducing the influences of multipath propagation, these procedures use a stepwise switching between the frequency channels. Certain channels are provided for submitting a binary 1, while other channels are provided for submitting a binary 0. Five channels carry the same information, wherein the power portions of the redundant channel groups are added in the receiver and compared for reducing fading effects. Accordingly, the natural redundancy caused by the multipath propagation is reduced by the introduction of an additional synthetic redundancy (10 frequency channels are used for each bit). This common procedure is relatively stable. However, it does not allow modulations with an increased graduation.

Irrespective of whether the transmission takes place in a narrow or broad frequency band, encoding by means of serial "clicks" only allows for a limited information transfer rate. With a shortening of the pulses, the band broadening increases. Furthermore, Doppler effects may be compensated in a restricted manner only.

Another common multichannel system (see WO 99/19058) uses the so-called Orthogonal Frequency Division Multiplexing (OFDM) also for channels with constant frequencies in combination with a Forward Error Correction (FEC). This is in particular provided for a reduction of errors caused by the superposition of multipath components. This procedure is described as allowing a Differential Quadrature Phase Shift Key (DQPSK) modulation with bit rates up to 3000 bps (OF 31 carriers and FNR =10 dB) and up to 9600 bps (with 100 carriers). Unmodulated pilot signals with constant frequencies are transmitted above and below the frequency band used for information transmission for compensating Doppler effects. The frequencies of the pilot signals are permanently monitored with two separate PLL's which submit corrections to a Discrete Fourier Transformer (DFT) unit. This procedure represents a complicate method which requires a complex technical equipment. Furthermore, this procedure uses the transmission physics in a restricted manner only.

The prior art development of transmission techniques is directed on complex post-transmission processing with complicate equalizers, PLL and correction algorithms which are implemented with the DSP technique. A further improvement has been obtained with the so-called beam forming (see e.g. O. R. Hinton et al. in "Signal Processing VII: Theories and Applications", eds. M. Holt et al., European Association for Signal Processing, 1994, pp. 1540–1543). For the beam forming technique, the receiver is provided with an array of receiver elements to be focussed to certain multipath arrivals. However, this technique is restricted to short distance transmissions only.

It is known from solar and radar techniques that pulses with linear frequency modulation (LFM pulses or angel-modulated pulses) with a continuous frequency change have some advantages in particular under high noise conditions. These advantages comprise improved energy distribution, recognition, SNR as well as a higher system gain. Attempts have been made to use this effect in underwater communication. There are known some procedures in which a series of pulses with linear frequency change are serially transmitted instead of pulses with a constant frequency. It is known to discriminate between increasing and decreasing LFM signals additionally to the detection of the presence or non-presence (binary 1 or binary 0) in the ON phases. These procedures allow a switching of the frequency change direction only but not modulations with higher graduations.

It is known from mobile telephone transmissions to start information signals with a preamble of LFM pulses. This preamble or header facilitates the synchronisation in multiuser operation. Furthermore, both the high frequency transmission and the optical information transmission use procedures with a generation of mono-frequency pulses (so-called CW pulses) which have an extremely short duration and correspondingly a broad band characteristic (frequency broadening). These pulses are timely dilated with dispersion filters (so-called SAW or Surface Acoustic Wave filters) and serially transmitted in a predetermined frequency band. The heads of the LFM signals are located in predetermined narrow time slots. The broadened signals may have a time overlap during transmission which however does not destroy the principle of serial transmission. The signals are compressed in the receiver. For the dilation and compression, the same SAW filters are used in reversed directions. Depending on the arrangement of these elements, increasing or decreasing signals can be generated or demodulated. The amplitudes can be varied correspondingly. However, the modulation potential of these elements is restricted at this point. The frequency increase is delimited for technical reasons. With a shortening of CW-pulses, the frequency broadening and the duration of LFM signals is increased. The maximum length of LFM pulses is fixed due to the definition of the length and material of SAW filters. Each pulse can have one predetermined state only. Accordingly, it can transmit one information unit only. SAW filters are not usable for the decoding of low frequency acoustical signals in UW communication. Furthermore, SAW filters have tuning problems in particular as a result of multipath influences and Doppler shifts.

Attempts have been made to improve the transmission of serial LFM pulses by pulse-wise switching the start frequency (multiplexing on parallel frequency channels) in order to reduce the problems of multipath propagation. In U.S. Pat. No. 6,047,023, a mobile receiver is described which is capable to process longer LFM carrier signals. Basically, this technique corresponds to the above submission of short LFM pulses in predetermined time slots. The carrier signals are generated with other components only and subsequently demodulated. All carrier frequencies have the same gradient. Accordingly, all tracks are parallel to each other. The time slots have to be defined such that the tracks have a partial time overlap while the frequency bands always have to be separated from each other. With this procedure, complex modulation techniques can be used for information coding in the high frequency range only.

A general problem of commonly used LFM carrier signals is the following. On the one hand, down-stream equalizers show an increasing complexity. On the other hand, an appropriate equalization function cannot be formed without a compensation of the multipath spectrum contained in the received signals. Accordingly, additional distortions result. In the prior art, the presence of multipath arrivals (multipath components) with different arrival times has been considered as a problem which has to be solved with signal processing techniques. Multipath arrivals have never been used as a technical effect. This was in particular a result of the fact that the commonly used LFM carrier signals have small frequency gradients and inflexible structures.

Another problem of LFM signals is given by strong Doppler shifts which occur in particular in acoustic UW communication. Up to now, there is no procedure available which uses the advantages of a continuous frequency change of the carrier signals for a seperation of multipath components (so-called channel responses) by the timely synchron provision of a plurality of signal components forming a common system in a given frequency band which components can be used for a complete doppler compensation.

OBJECTS OF THE INVENTION

An object of the present invention is to provide a process or a suitable system for the transfer of information which will allow for a high transfer rate over long range.

That object is, further, to provide a process or system for the transfer of data which is resistant to the causes of interference referred to heretofore, and is capable of adaptation to different transfer conditions.

In particular, that object is to provide a suitable system for signal processing which is capable, with a high degree of selectivity and the best possible exclusion of intersymbol interaction, of always isolating and analysing as far as possible, from a large number of channel responses, those signal components with the smallest transfer losses.

A further object is to provide a process or suitable system for signal processing, which in the same context will guarantee the most complete compensation possible for Doppler effects.

A still further object is, by attaining the best possible quality of signal processing, to create the preconditions for a substantial increase in the transfer rate and, if applicable, also in the range, even under complicated transfer conditions, such as, for example, in the case of communication with or between moving objects under water.

SUMMARY OF THE INVENTION

According to the invention, an information signal is generated which consists of at least two signal components, at least one reference component (BK) and at least one information component (I1; I2; . . . ; IN), so that several frequency channels or components are available. By the simultaneous use of these, more information units can be transmitted per time unit. In addition, discrete states are provided by both the reference frequency channel or the reference component, as well as the information frequency channel or the information component, which form a bit pattern.

To provide the bit pattern in the simplest case, the frequencies or tones of the information frequency channels can be switched on or off, whereby the presence or absence of the signal frequency components concerned is evaluated as binary information (ON/OFF), i.e. 1 or 0. In this way it is therefore possible to transfer a bit on each of these information channels. The signal components together produce a bit pattern, in which the information can be encoded in any desired manner.

While this simplest case relates to practically all the parameters of the information signal concerned, it is however possible, in the ON states, for different signal parameters to be varied in such a way that a distinction can also be made between other digital states.

According to the invention, the frequency of at least one these components is timely continuously changed during the transmission. According to this measure, which is called Frequency Gradient Method (FGM) in the following, the influences of reflections and distortions on the transmission path can be eliminated.

After receiving the information signal, the at least one frequency variable component is transferred into constant intermediate frequencies. In the course of signal processing, the following feature is used for a separation of the signal components. Depending on the increase of the frequency gradients used in the transmitted signal, the run time differences of the multipath components contained in the received signal are represented in the form of frequency differences after the transfer into constant intermediate frequencies. The best signal components are selected from the spectra of constant intermediate frequencies (Z'1; Z'2; . . . ; Z'N+X), preferably by the use of filter devices. Subsequently, the relevant information parameters are evaluated.

A system for the transfer of information, being adapted to carry out a process according to the invention, comprises at least one transmitter unit and at least one receiver unit, between which an information signal (IS) is transmitted, wherein the transmitter unit has a device for creating reference component (BK) and at least one information component (I1; I2; . . . ; IN), in order to generate temporally continuous frequency changes and to provide a bit pattern, and the receiver unit contains a device for the acquisition of the information signal (IS) consisting of at least one information component (I1; I2; . . . ; IN) and one reference component (BK), in which at least one component has a temporally continuous frequency change.

Further details and advantages of the invention are described with reference to the attached drawings.

DETAILED DESCRIPTION OF THE PREFERRED EMBODIMENTS

Figure 1:
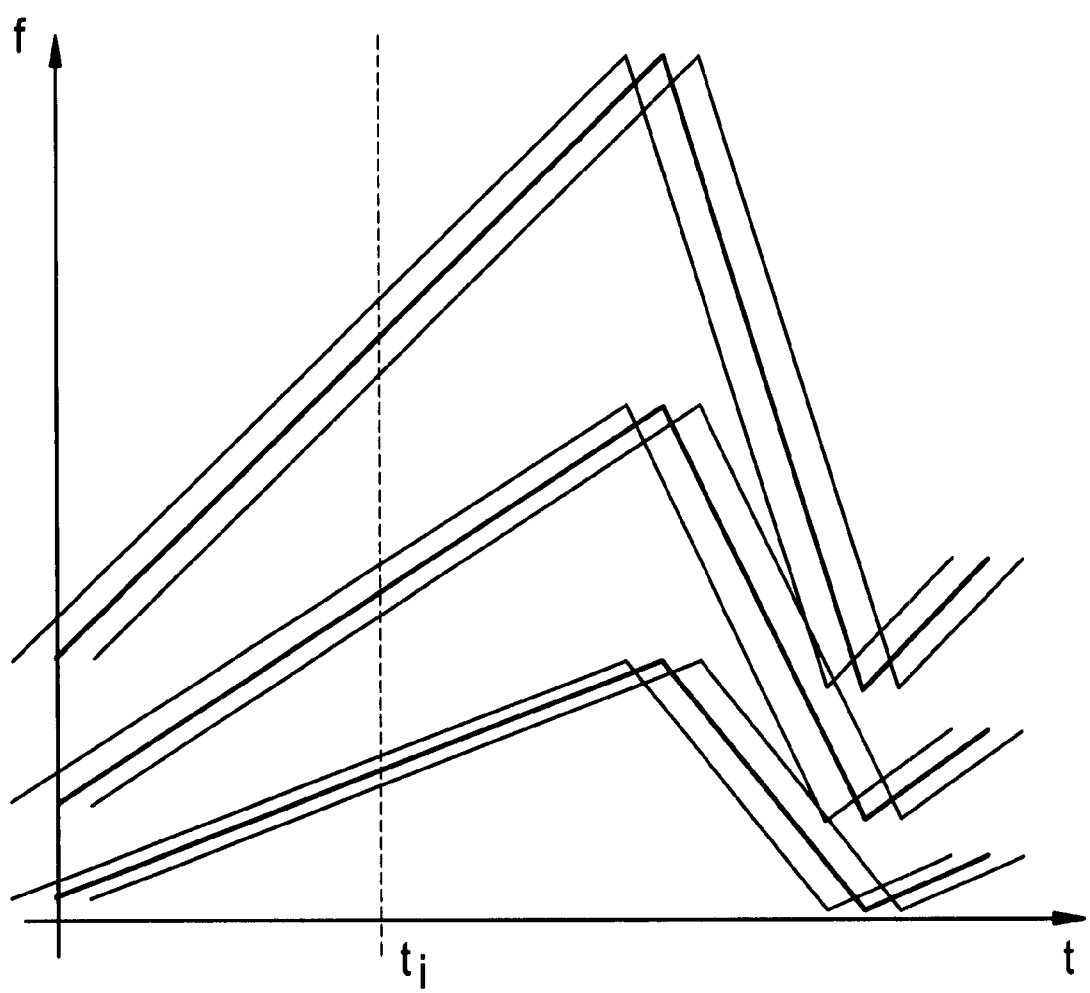
FIG. 1 shows the signal analysis at the moment ti of an advance and following interference component by means of the proportional FGM, relating to three information frequency channels standing in a harmonic relationship to one another.

According to a preferred embodiment, the reference frequency channel is formed as a fundamental tone or fundamental wave, and at least one of the information frequency channels is formed as a harmonic tone or harmonic wave to the fundamental tone, or all the information frequency channels are formed as harmonic tones to the fundamental tone. Then, the individual frequencies and tones or signal components form a harmonic series and therefore a consonance system. A special feature of the system according to the application is that the fundamental tone with the lowest frequency, which has the greatest range, can be permanently transmitted during the transfer of the information, and therefore in a manner of speaking forms a permanent bridge between the transmitter unit and the receiver unit. The reference frequency channel, designed as a fundamental tone, does not in this case serve for the actual transfer of information, but as a constant reference for the tuning of the other information frequency channels, and, if appropriate, as will be demonstrated later, for the determination of the relative phase positions, as well as an energy provider in the event of the use of non-linear effects to increase the range of the entire frequency system. At this point, however, attention should basically be drawn to the fact that, instead of the low tone, any other desired tone of a predetermined frequency spectrum can be used as a reference tone or fundamental tone, if this is of more advantage for a given application with specific environmental influences.

By the determination that the information frequency channels always have a defined separation from the reference frequency channel, it can be guaranteed that the receiver unit, to which the corresponding separations and proportionality factors are known, needs only to sense the reference frequency channel formed as the fundamental tone in order to be able to identify, in reference to this, all the other active information frequency channels and to tune them constantly in an operational manner. This tuning process can be automated to such an extent that the system can be adapted without major additional effort to the most widely differing transfer conditions. The automatic identification of the fundamental tone and the corresponding self-adaptive tuning of the information channels on the part of the receiver unit signifies an enormous advantage, in particular with regard to communications with or between moving objects, since the problems caused with conventional processes by Doppler effects, for example, will be done away with, if, for example, a harmonic frequency channel system is used.

On the basis of the temporal frequency change of at least one component, with the adaptive system a constant readjustment can be carried out, not only by the receiver, in compensation for frequency displacements (Doppler effects, etc.) caused naturally; rather, it is now also possible for a regulated temporal change of the frequency spectrum to be created on the part of the transmitter unit, without prejudicing the link to the receiver.

Due to the temporal frequency change, one or more frequency gradients can be provided. This process is referred to hereinafter as the frequency gradient method (FGM). With this method the result can be achieved that, for example, reflections or interference signals are eliminated. The variation of the reference or information components on the basis of the FGM is also referred to hereinafter as VMT (variable multichannel transmission). With this regard, embodiments are preferred in which the frequency interval is temporally constant or capable of time-proportional change.

If the variation of the components is always effected proportional to one another, a pFGM or pVMT is taken as the starting point, while by contrast, with a variation of the components which is effected in parallel, a paFGM or paVMT is taken as the starting point. Examples are shown schematically in FIGS. 1, 3, 8 and 9.

By the use of FGM a substantially sharper and more reliable signal can be achieved than with conventional techniques, in particular such as have fixed frequency channels. Since in this case the working frequencies of the information frequency channels are constantly changing, all the signal components which arrive at the receiver unit on different transmission paths at a given point in time now have different frequencies.

In the example shown in FIG. 1, three information frequency channels were selected by way of example, on which, in addition to the actual signal frequency, in each case one advance and one following frequency arrive at the receiver as interference signals, whereby the time displacement in each case was selected as identical for all three information channels. To make the underlying principle clear, the indication of the pulses has been left out. The vertical broken line (starting from ti) makes it clear that, at a given moment ti, all the information frequencies received differ from one another. It is of particular significance, however, that, due to these frequency changes, the actual signal frequencies can now be separated from the interference frequencies, and the intersymbol interactions can be very largely eliminated, if not completely. It is important in this connection that the amplitudes and phase positions of the signal components received and as such "refined" have a clear reference to the reference frequency channel. With the use of the FGM, special frequency filters can be used to separate the actual signal frequencies from the individual interference frequencies. From FIG. 1 it can clearly be seen that the spacing of the signal frequency from the interference frequencies becomes greater, the steeper the gradient of the frequency change df/dt, i.e. the greater the individual frequency rate is. Because in the system shown in FIG. 1 all the information frequency channels are always changed proportionally to one another, an increasingly steep gradient is derived for the higher information frequency channels, and therefore a constantly better separation of the current signal frequency from the interference frequencies.

Figure 2:
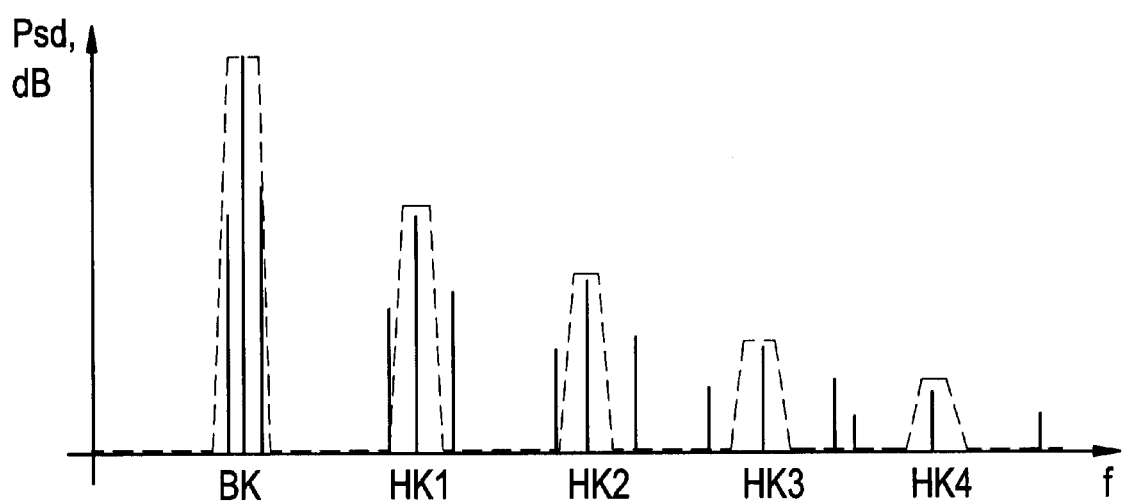
FIG. 2 shows the basic principle for improving the signal analysis in respect of the interference signals according to FIG. 5, making use of a reference frequency signal and four information frequency channels.
Figure 3:
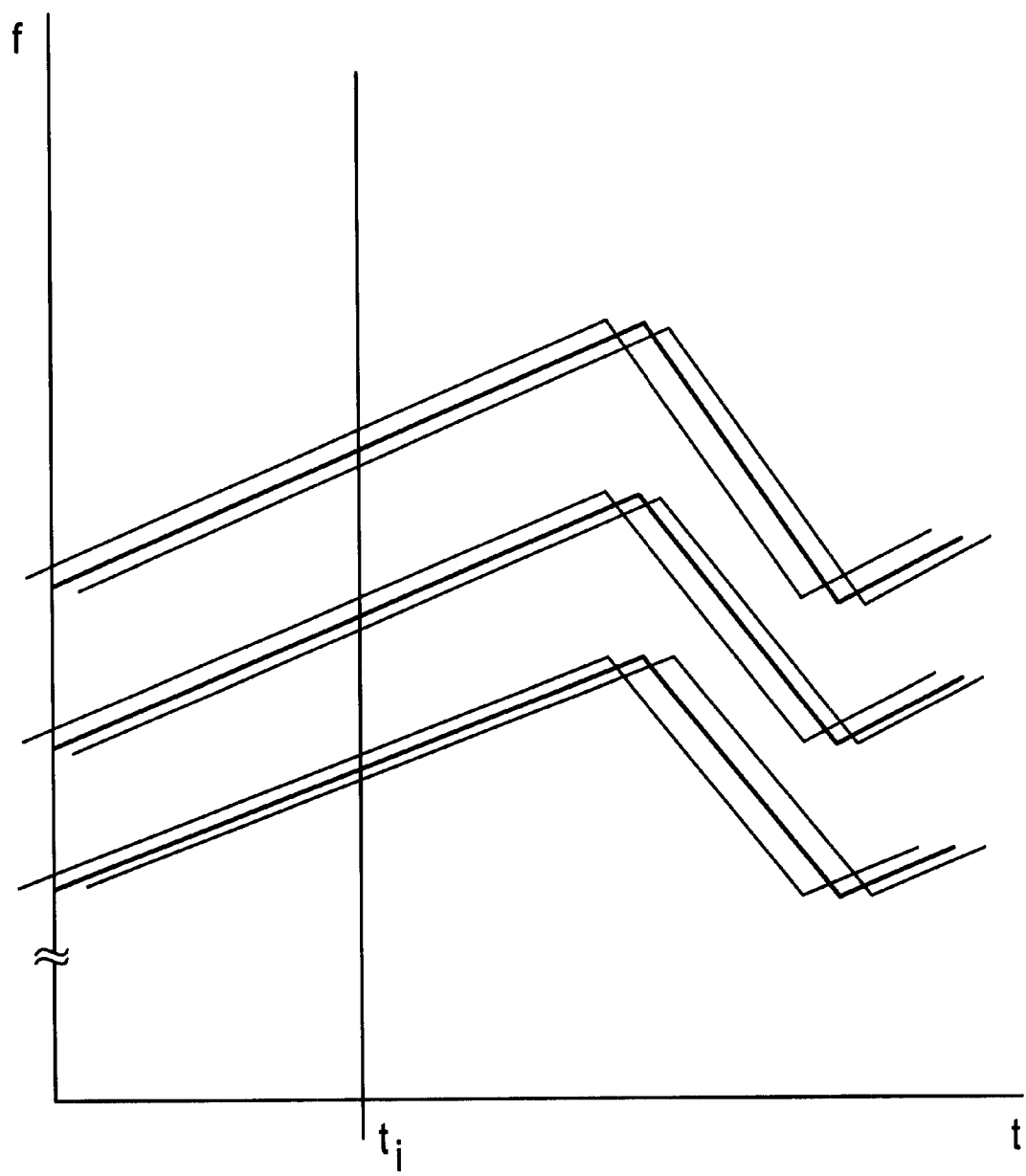
FIG. 3 shows the signal analysis at the moment ti of an advance and following interference component by means of the parallel FGM by reference to three information frequency channels standing in a harmonic relationship to one another.

In FIG. 2 this function and effect are shown in diagrammatic form for a system with one reference frequency channel and four information frequency channels, with two adjacent interference frequencies in each case. The broken line shown in FIG. 2 symbolises the characteristic of a conventionally used filter. It can clearly be seen that even with a constant window width of the filter for the higher information frequencies, an increasingly better separation sharpness is achieved. In comparison with conventional processes, a perceptibly better resolution is achieved overall. Mention should be made here in particular of the fact that with the process according to the application, it is in particular the higher information frequency channels, which are always most strongly attenuated on the transmission stretch, and, as a consequence, arrive at the receiver with the lowest energy, which can be better released from the noise. From this process it becomes clear that, for example, with interference frequencies which are located very densely at the actual signal frequency, it is to the purpose for a steeper frequency gradient to be selected for better separation; i.e. the drift rate of the frequencies increases, while by contrast with larger spacings flatter gradients can be sufficient. For such adaptations, for example, either a prepared range of frequency displacement patterns can be used, or an operative adaptation of the gradients to the frequency change can be effected. The latter is easily possible, for example, if the connections are being used bidirectionally, i.e. the transmitter unit can also receive and the receiver unit can also transmit. In this way, for example, analyses of the channel response behaviour can be carried out and exchanged between the transmitter unit and the receiver unit, or a corresponding pattern training can even be carried out, whereupon the optimum gradients are set for the frequency displacement in each case.

In this connection it may be noted that the possibility pertains in principle, in order to maximise the transmission rate, for the pulse frequency to be changed in proportion to the frequency level of the reference frequency channel, since only a specific number of oscillation periods are ever required for the signal as a whole to be analyzed in respect of the individual components contained in it.

Since with FGM the frequency of the reference frequency channel, and in synchrony with this, in a given proportion, the information frequency channels can also be varied almost as desired, both the process according to the application as well as the system according to the application are extraordinarily flexible. Due to the deliberately induced frequency drifts, mutual superimpositions of several transmission systems can be avoided, and possibly undesirable eavesdropping is rendered more difficult.

A further method of minimizing interferences comprises a coding procedure which excludes the presence of a signal or tone in two subsequent clocks or transmission intervals in the information channels. The same effect can be obtained by multiplexing, i.e. by a variation of the starting frequencies of the components in each transmission interval, e.g. by the interchanging operation of the even and uneven information channels.

Figure 14:
FIG. 14 shows a number of diagrammatic examples of favourable frequency spacings in different applications.
Figure 14:
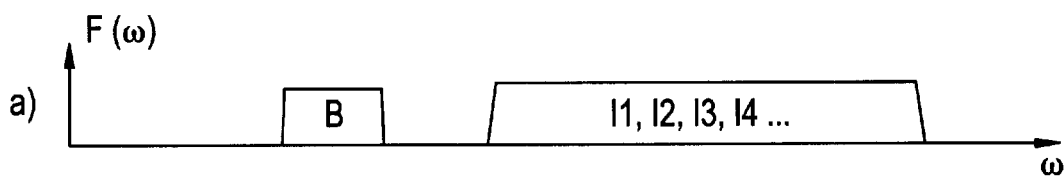
Figure 14:
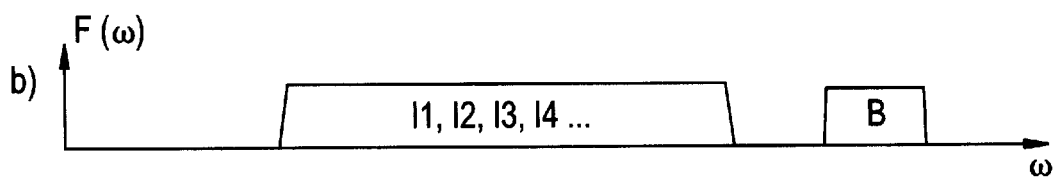
Figure 14:
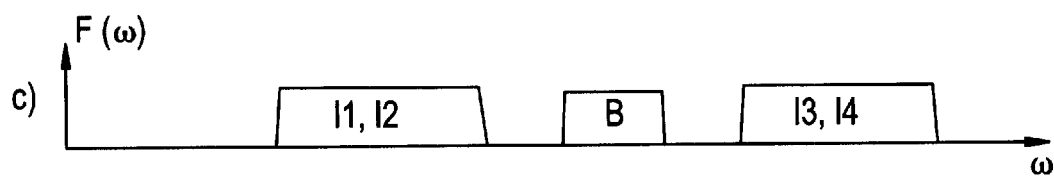
Figure 14:
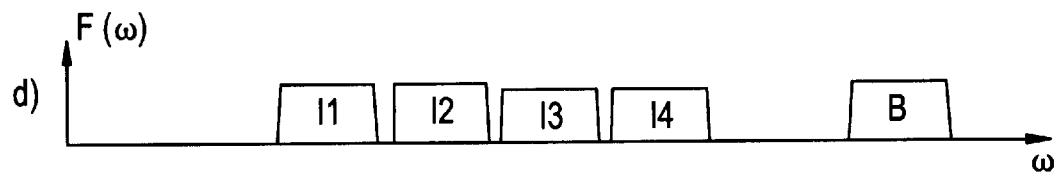
Figure 14:
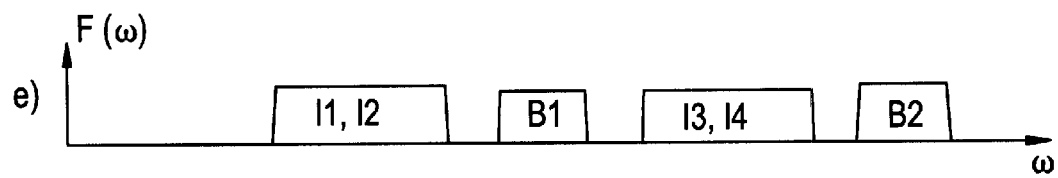

In view of an improved signal processing, it may be advantageous if at least one of the components, preferably at least one reference component (BK), is located in a separate frequency band. FIG. 14 schematically shows corresponding examples.

On the other hand, the method according to the invention may be adapted for the provision of transmission signals with overlapping gradients in which the frequencies are varied. Accordingly, the frequency bands of two or more components may overlap. By this measure the information rate can be increased and the capacity of the transmission channel can be used in an improved manner.

The broad variability of the design of the procedure supports the capability or adaption to different transmission conditions and user requirement.

The coding can be made more complex if other signal parameters are used for generating a bit pattern additionally to the frequency of the reference frequency channel and the information frequency channel. Accordingly, a time series of bit pattern can be generated and the information rate can be increased.

If the bit patterns are generated in a pre-determined time clock, they can be decoded in a simple manner in the receiver so that the transmission precision is increased.

Figure 8:
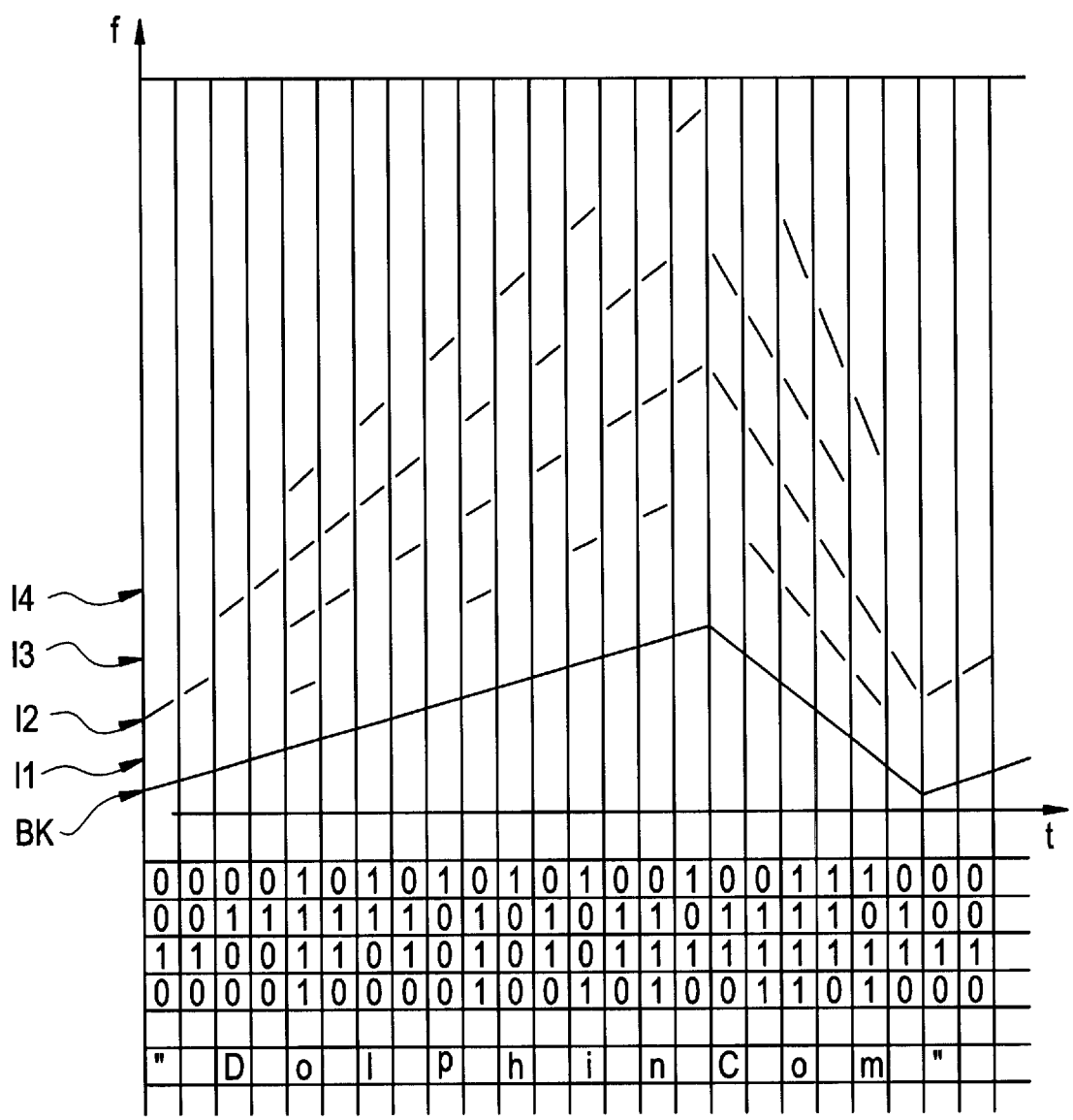
FIG. 8 shows a diagrammatic representation for the encoding of an item of information.
Figure 9:
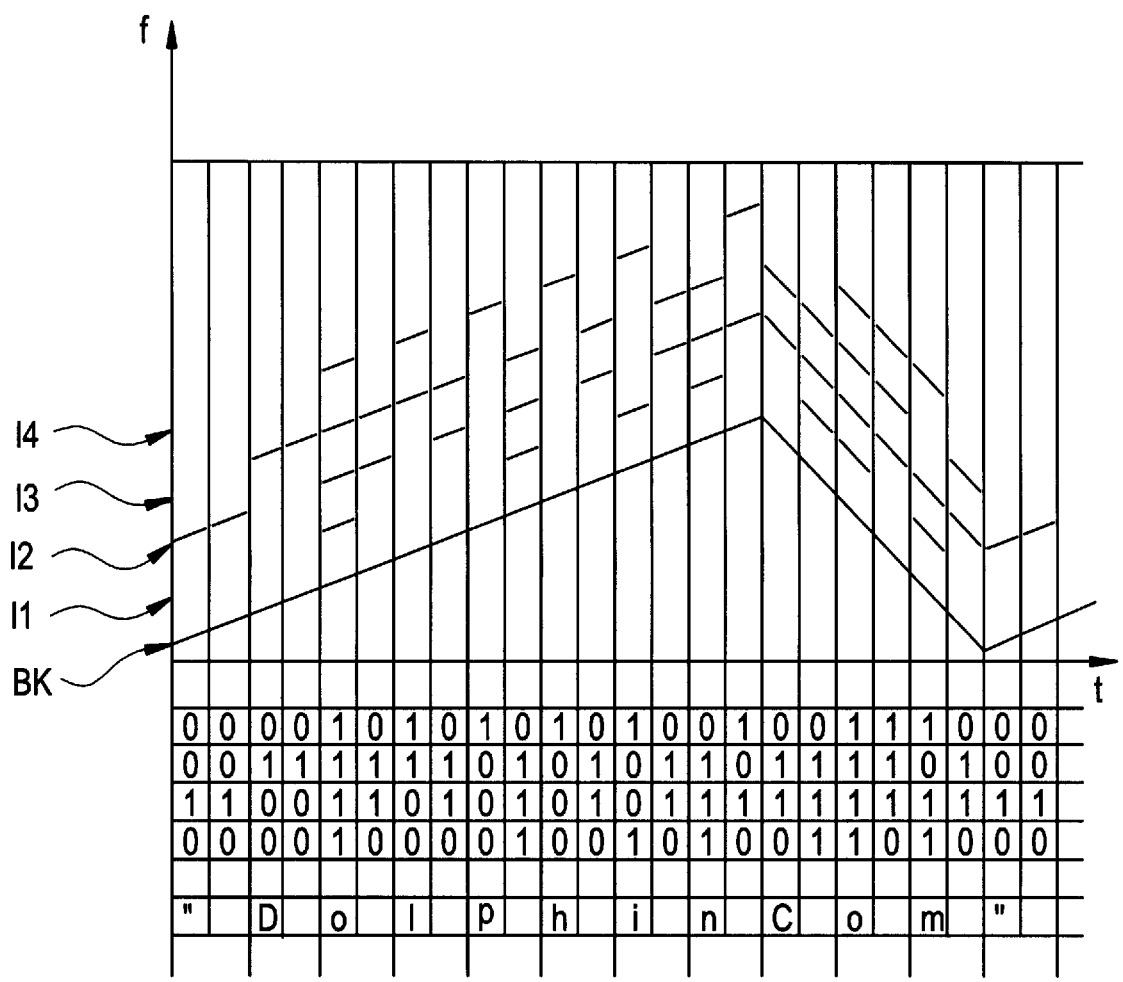
FIG. 9 shows the encoding of FIG. 8 with parallel FGM only.

In FIG. 8 it is shown how, for example, the word "DolphinCom" can be transferred in the generally-known ASCII Code, making use of four information channels. The frequency system which forms the information signal consists in this illustrative example of a reference frequency channel used as the fundamental tone GT, and four harmonic information frequency channels (I1, I2, I3 and I4) as harmonics built on that, which are temporally varied by means of the proportional FGM. The encoding is effected in this example only by the switching on and off of the harmonics. The vertical lines show the pulses, which in this case always have the same length. For each pulse there is a special bit pattern, which is designated as a symbol. In each case, two symbols together produce a letter in the ASCII Code. The word "DolphinCom" is shown. In principle, however, any other desired code can also be used for the encoding of the information which is to be transferred, which allows the user maximum room for manoeuvre for own programming, and renders the system compatible with almost all EDP systems. As is shown in FIG. 8, the reference frequency channel changes continually, whereby the frequencies of the four information frequency channels (I1, I2, I3 and I4) are displaced proportionally. By contrast, FIG. 9 likewise shows how the word "DolphinCom" in the ASCII Code can be transferred using four information channels, whereby, as in FIG. 8, the reference frequency channel changes continually; however, the information frequency channels initially arranged for example harmonically to the reference frequency channel, are always displaced parallel with the change in the reference frequency channel.

As a result of the high reception quality which can be achieved in particular by the use of FGM, in combination with the switching on and off of the individual signal components already described, or instead of this, it is possible for the information to be encoded in finer variations of specific signal parameters or parameter combinations. In view of the fact that, in the signals received, in addition to the frequencies, the amplitudes and phase angles of the signal components now have a more strongly defined reference to the signal originally generated, practically all the parameters can be incorporated into the encoding. This can be carried out, for example, by means of step-by-step changes.

Figure 10:
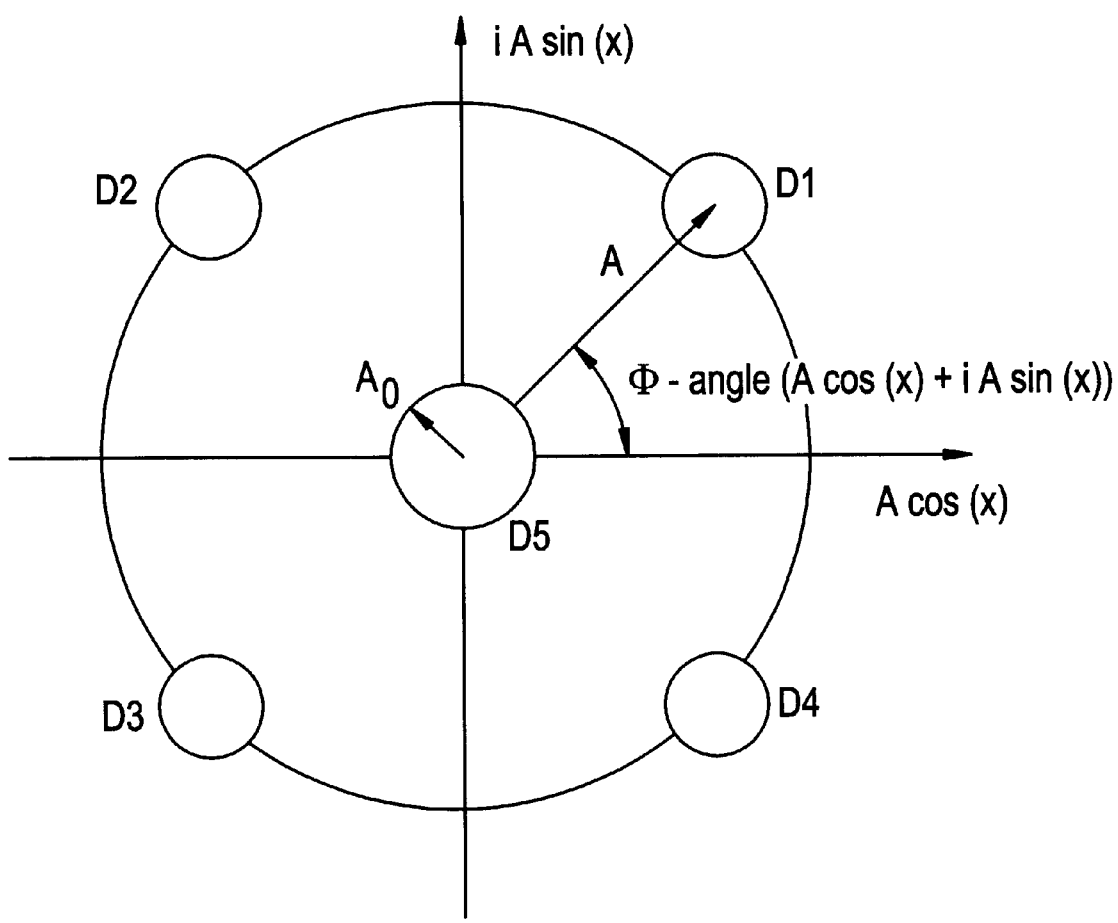
FIG. 10 shows as an example the principle of pentary encoding of an information frequency channel.

FIG. 10 shows, as an example, the principle of a pentary encoding of an information frequency channel. The points indicated with the reference characters D1 to D4 are signal components, in which the amplitude exceeds a threshold value A0 and four different phase angles F or four angle ranges, which can digitally distinguish, for example, by means of the RPWN or the RPDM, and contain the state D5, that the amplitude of the signal components is smaller than the threshold value Ao.

Figure 11A:
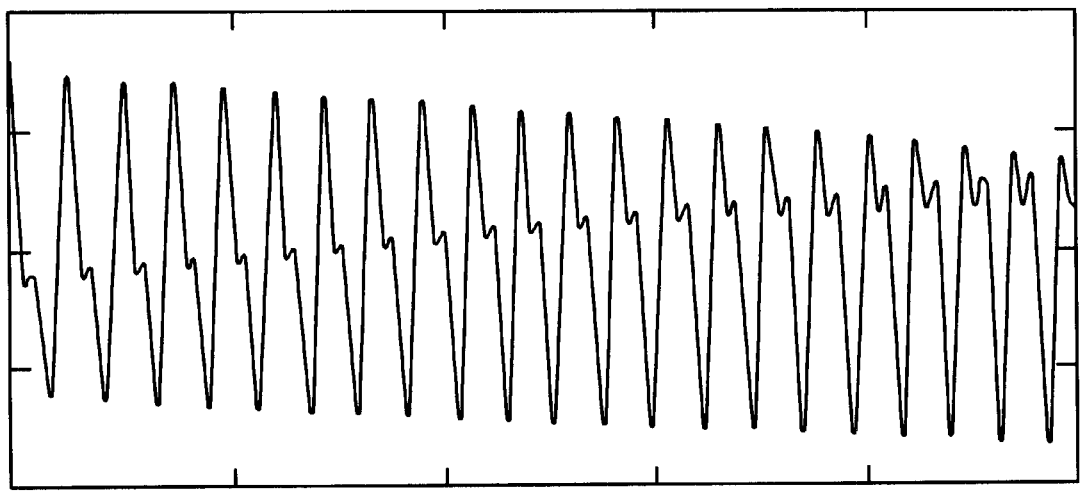
FIGS. 11a and 11b show two different phase gradients produced by means of the pPGM.
Figure 11B:
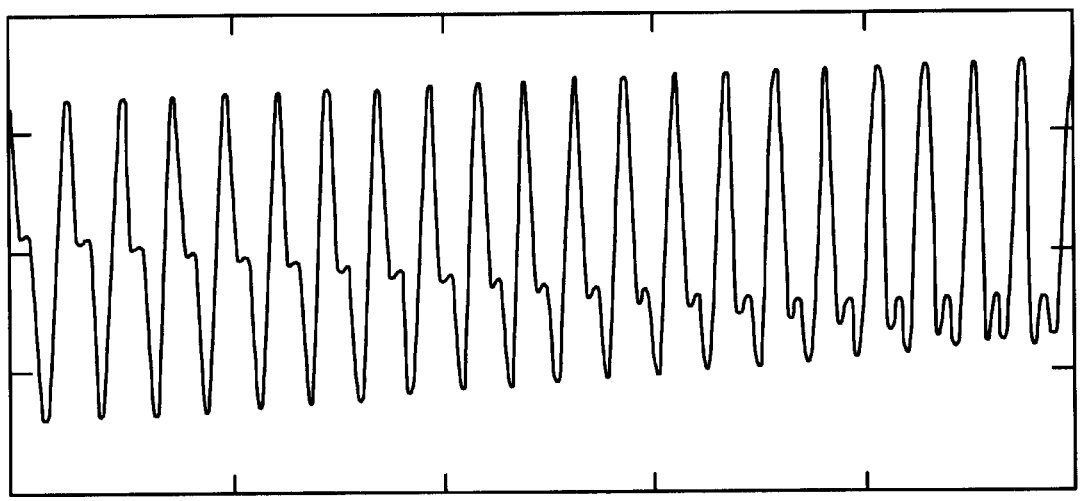

A further method for the information encoding is, for example, the phase-gradient method, or also the phase-velocity method, abbreviated hereinafter to PGM, and which is illustrated in FIGS. 11a and 11b as well as FIG. 12. FIGS. 11a and 11b show what is referred to as the proportional phase velocity method (pPGM), while FIG. 12 additionally shows the relationships with the non-proportional phase-gradient method (nPGM).

The superordinated principle of the PGM can be most easily explained on the basis of the following initial configuration.

The given starting point is a system in which the information frequency channels always from a harmonic sequence, i.e. frequency changes are only carried out by means of the proportional FGM. Any desired information frequency channel can be selected, but on which the corresponding frequency is now transmitted in a given pulse interval, not exactly as a harmonic of the GT (fundamental tone), but which, in comparison with the corresponding "reference frequency" (typically less than 0.5% of the reference value) is detuned slightly upwards or downwards (see FIG. 12, top row). Basically, a frequency displacement is being carried out in this case, but it is so small that on the receiver side, solely on the basis of the frequency analysis, it is difficult to identify it as modulation, and, as a consequence, it is also not possible for it to be interpreted as a digital status value. The frequency continues to lie in the sharp range of the analysis filter concerned. Depending on whether it is now somewhat higher or lower than its reference value, however, with the superimposition with the GT, the image represented in FIGS. 11a or 11b is arrived at, in which the relative phase angle continually increases or decreases. The phase of the frequency of the information frequency channel precedes that of the GT or remains behind accordingly. In the corresponding pulse, therefore, a phase gradient is created, the direction of which can already be identified with the naked eye and at the same time can be determined without difficulty. In the evaluation of the phase gradients in relation to the period duration of the GT at a particular moment, in the present case a constant rise is derived. A precondition for such a linear characteristic, however, is that, with a continuous frequency change of the entire frequency system, the internal proportions are retained, although they are now easily changeable in the given time interval; i.e. the relative detuning of the frequency of the information frequency channel does not change in relation to the GT. The fulfilment of this condition is made clear by the designation pPGM, in which the small 'p' stands for 'proportional'. Considered in cyclic terms, in the case of the pPGM a uniform right or left rotation respectively is incurred of the information frequency phase against the phase of the reference frequency channel.

This effect can now be used to great advantage for the information encoding, since, in the signal analysis, the sense of rotation, i.e. the direction of the phase gradient, can be determined substantially more easily than, for example, the amount of the phase displacement. In mathematical terms this means that only the sign of the first section of the relative phase displacement between the frequency of the information frequency signal and GT must be determined; in other words, it must be determined whether the relative phase velocity is greater or less than zero (see FIG. 12 top). This process can now be applied in each time pulse for each information channel individually. Accordingly, it is possible to increase the information rate.

As an alternative to this, a correspondingly large number of information frequency channels can also be saved, in which case the frequency spectrum can overall be kept narrower, which likewise incurs several advantages, which can optionally be put to advantage. In this case, the transducers do not have to be so wide-band in design, which, inter alia, with the use of transducer cascades can have the effect that individual, or even several, elements can be saved. This can be of advantage, for example, in reducing equipment costs. On the other hand, however, with an unchanged equipment configuration, the larger variability and adaptability of the system which is now derived can be put to advantage. For example, there is the option of increasing the information rate by shortening the pulse times as a result of leaving out the lower frequencies, while the waiving of the higher frequencies results in a greater transmission range. There is accordingly a whole range of good reasons for striving for the largest possible cardinality (number of digital stages), and so increasing the information density on the information channels.

The pPGM can now be developed further to the extent that, in addition to the direction, for example, it is also possible to make use for the encoding of different rises in linear phase gradients, which can be produced by detuning to different degrees of the frequencies of the information frequency channels, whereby, depending on the degree of discretisation attainable in the specific case, further combination and encoding possibilities are derived.

Figure 12:
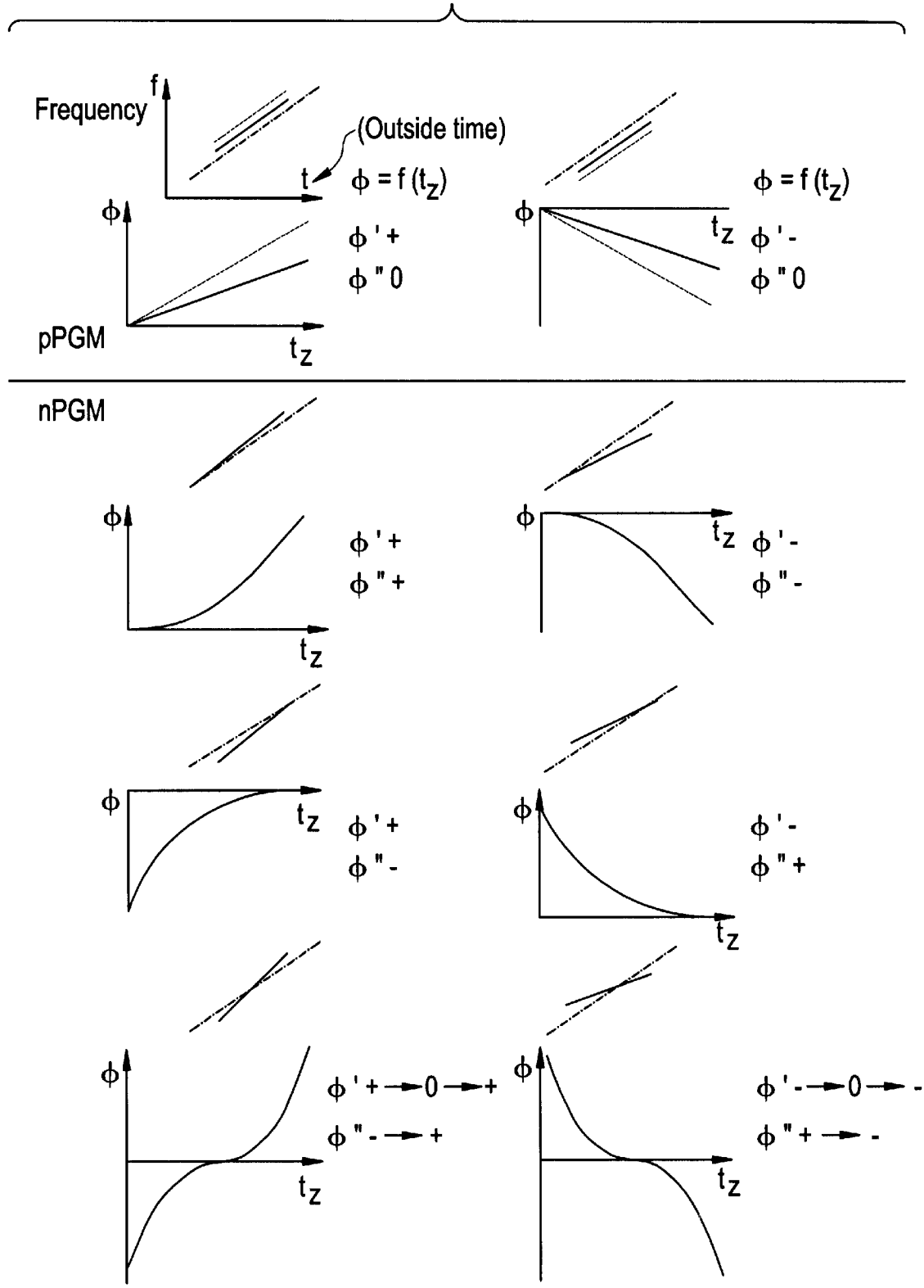
FIG. 12 shows different phase gradients which can be produced by means of the nPGM (top) and the pPGM (bottom)

In conjunction with the FGM, however, positive or negative phase gradients can also be achieved by such frequency changes of the information frequency channels, which are not carried out exactly proportional to the change in the fundamental tone (see FIG. 12 bottom).

To distinguish it from the pPGM, this variant is designated as nPGM, where 'n' stands for 'non-proportional'. The nPGM can be realised, for example, in that the frequency of the particular information frequency channel is changed in a given pulse interval to slightly faster or slower than is provided for, for example, by the basic variant of the proportional FGM. It can now clearly be seen that both variants of the PGM are to be used at their most favourable for harmonic frequency series in conjunction with the proportional FGM.

According to another embodiment, the bit pattern is changed within a time pulse, so that it is possible for e.g. a first part within the time pulse to be used to identify which information frequency channels are basically being used for the transmission of information, and, for example, to use the remaining part for the generation of the bit pattern itself. In addition, in this case, the first part also provides a further reference in addition to the reference frequency channel, with the aid of which the parameters of the signal components transferred in the second pulse section can be determined with very high precision; in this way, the reliability of the transmission can be increased.

In this situation a substantial advantage of the process consists of the fact that internal signal references can be used for the encoding. By means of this relativisation, the situation can be achieved in which the bit patterns or symbols can already be identified on the basis of one or two received pulses, without an additional reference to an external reference value being required.

Thus, for example, the phase angles can be determined in the form of the current relationship in the given time pulse in each case between the individual information components and BK. This encoding method is designated as the relative phase-angle method, RPWM (RPAM) for short. In this method, the previous history no longer plays a part, and the outside time loses its significance for the signal evaluation. Instead, the relative system-internal time is drawn on, which, for example, can be read off on the basis of the cycle time at the particular moment of, for instance, the BK, and which, considered from the outside, is dependent on the current frequency in each case. The relative phase angles can be determined in a simple manner if, for example, in the evaluation process all the signal components, i.e. information frequency channels and reference frequency channels, are initially normed to one uniform period duration. This, however, is only intended to illustrate the principle. From the signal processing a wide range of projection and transformation procedures are known, which can be drawn upon to determine the relative phase angles. The user accordingly has a broad scope for practical implementation. For the process according to the application, however, it is important that in the result of the FGM and in particular of the pFGM a range of interference effects can be eliminated, so that the relative phase angles can also be determined with greater precision, which can be used for a finer discretisation, in other words the distinguishing of more digital states and therefore for a further increase in the information rate.

A further variant pertains, for example, in that the information is not encoded directly in the phase angle of the individual components in relation to the BK or the GT as what is referred to as vertical signal-internal reference, but in the difference between this and the component in the last relative phase angle calculated before it, as what is referred to as horizontal signal-internal reference. This method is designated the relative phase difference method, RPDM for short. With the RPDM, the first pulse in each case of a closed transmission sequence serves exclusively as a horizontal reference. Under very complicated transmission conditions it may also be of advantage, however, for the RPDM to be used in conjunction with the variation of the bit pattern within a time clock. By contrast, it may also be sufficient, with very favourable transmission conditions, to make use exclusively of the horizontal signal internal reference for the determination of the relative phase angles. In this case, the reference frequency channel can likewise be used for the information encoding. It may further be noted that both with the RPWM as well as with the RPDM, the absence of a signal component or the undercutting of a specific amplitude threshold value can comprise an additional digital state.

In addition to the specific states or proportions referred to heretofore, it is also possible, in the process in question, for the information also to be encoded in its momentary temporal change, i.e. in the dynamic characteristic.

If the individual information frequency channels are designed as broad or wide-band, but without overlapping, the possibility is provided of creating a continuous phase displacement of the signal components concerned, and of using this, for example, for the information encoding. This measure is referred to as the phase-gradient method or the phase-velocity method, PGM. The distances from the reference tone then typically relate to the characteristics curves of the mean value of the corresponding channels. During the information transfer it is now possible, in each time pulse, for the frequencies of the individual information frequency channels to be displaced or continuously altered within a given channel, slightly, and typically by less than 0.5% of the current reference value in each case, as a result of which a continuous and uniform or accelerated phase displacement of the individual information frequency channel in each case, in relation to the fundamental tone or reference frequency channel is brought about. The receiver unit not only recognises whether, in a given time pulse, a frequency was sent on the corresponding channel, but also determines, if a frequency is present, the relative phase angle and/or characteristic parameters, which describe their function, for example, as a function of the current cycle time in each case of the fundamental tone or reference frequency channel. Accordingly, in addition to the actual state or proportion values, their temporal changes for the encoding can also be used. From this derive a wide range of variation and combination possibilities, which can be used to increase the information transfer rate, for greater adaptivity of the transfer system under different conditions of use, and also for the optimisation of the devices and their costs.

If, according to a further preferred embodiment, the number of information channels is changed as a function of the transfer path, then the situation is attained that, in particular with the reduction of the distance between the transmitter unit and the receiver unit, additional typically higher frequencies are used, or frequencies located between the previous channels, e.g. other consonant frequencies also, while by contrast, on the other hand, with very large spacings it is mainly lower frequency ranges which are used. With this measure, the optimum utilisation of the propagation characteristic of the wave signals is achieved, which is of great significance in particular with the use of sound signals. In this way, for example in the underwater context, in each case maximum bit rates and/or transmission distances which were hitherto difficult to achieve can be provided. This flexibility naturally also includes the principle that the adjustments made to specific transmission conditions can also be explained in relation to the basic standard, if this will enable a specified working range to be properly covered.

It is further possible that the reference frequency channel can be used as an additional information channel if required and provided that the special transmission conditions allow this.

For simpler handling and processing of the information signal, after reception the reference component is separated from the minimum of one information component.

According to another embodiment, the processing in pairs of the signal components carrying information in each case, with one of the reference components, or the best-suited in each case, enables compensation of the Doppler effect to be achieved. As an ancillary result, this processing stage can also assist in preparing a frequency stabilization process. In the case of the paFGM, this step can lead directly to the formation of stable, i.e. constant, intermediate frequencies.

The transferral of the signal components into constant intermediate frequencies ($Z1; Z2; \ldots; ZN+X$) by pairwise multiplication of components or signal sections and/or by multiplikation with auxiliary frequencies allows an advantageous further processing. One of these advantages consists, for example, of the fact that the constant intermediate frequencies ($Z1; Z2; \ldots; ZN+X$) can be placed in a frequency window which is optimum for the following filter stage and which at the same time allows for the use of an especially sharp filter.

With the use of a pFGM or pVMT, the possibility also pertains, without prior separation of the signal components and without the use of heterodyne frequencies, of creating constant intermediate frequencies for example only by the multiplication of the signal received in the current time pulse by the reception signal of the previous pulse. The variant of the signal processing is offered in preference in conjunction with the use of a differential phase encoding.

If necessary, a re-scaling of the amplitudes can be provided in the course of signal processing, e.g. after a frequency transformation. This allows to avoid errors in signal processing.

After the frequency transformation, it is possible to isolate, from the now frequency-stable spectra of the various channel responses, the best-suited signal fraction in each case for each signal component, or to filter it out, and in this situation to minimise possible interference influences from the other signal fractions. This latter procedure also includes the possibility that in this sequence the signal components can also be separated from one another, if this has not been effected earlier or if this has not been effected completely.

For this purpose, in the simplest case, special filters can be used. This allows, inter alia, for the components which are not required in each case, i.e. not being used for evaluation at that moment, to be filtered out. As a result, a clearly defined representative is acquired for each of the information-bearing signal components, on the basis of which the signal parameters used for the information encoding (for example, the amplitude and/or the phase location) can be reconstructed in the best possible manner. This also is only a representation of the basic principle. It is of course possible for more complex methods to be used from the generally known versatile repertoire of signal processing, which, for example, in addition to the identification of the signal components, also supply the parameters pertaining to them.

If a channel tuning is carried out at specific time intervals, the advantage is obtained that, for the current transmission circumstances in each case, those signal components and channel responses can always be identified on the basis of which the signal parameters can be determined in the optimum, i.e. best possible manner. As a rule, these are the strongest signal components, i.e. those richest in energy, which also allow for the best possible quality of signal evaluation to be achieved. By means of the channel tuning, for example, it is possible for the best possible filter settings to be determined, in order to filter out the desired components as precisely as possible, and to suppress the interference influences of the other channel responses and possible sidebands to optimum effect. The latter can, inter alia, contribute to an enlarged reception radius and/or also to an increase in the information rate. The better and more reliably the reception signals can be evaluated, the more possibilities are provided to use finer gradations or even different combinations of parameter variations for the information encoding.

By ongoing updating of the filter settings with an appropriate analysis of the spectra of constant intermediate frequencies, optimum receiver results can be achieved even under changing transmission conditions, whereby one advantage of the process referred to lies in the fact that no interruption of the actual information transfer is required for the channel tuning.

According to a preferred embodiment, Doppler frequency shifts caused by the transmission are determined (preferably internally within the system) and taken into consideration for the generation of the auxiliary frequencies. Accordingly, the advantage is achieved that Doppler compensation is optimised.

With regard to a preferred signal processing arrangement, a detailed consideration is provided hereinafter of different embodiments for the signal processing.

The procedure according to the application comprises two main basic functions, which can be carried out in different manners and applied in combination or individually as appropriate. These basic functions may be designated as complete Doppler compensation, abbreviated to vDK, and as "channel purification", abbreviated to KR. The corresponding basic principles will in the first instance be explained separately, before considering in detail the different technical and procedural modification and combination possibilities.

1. Solution of the Doppler Problem:

To explain the basic principles of the vDK, a simple example is selected in the first instance, in which the lowest frequency channel supplies the reference components and the frequencies of the information channels form a harmonic series; i.e. they stand in a whole-figure relationship to the reference frequency. If a variation of the frequencies is effected at the transmitter, this is by way of the pVMT. At the receiver, all the signal components are separated from one another in the first stage, for example by means of a cascade of band-pass filters (BPF). For the sale of simplicity, let it be assumed in the first instance that ideal transmission conditions pertain, so that each component consists only of a channel response and all the components can be transmitted and received with about the same strength. Such favourable circumstances can arise, for example, with the propagation of electromagnetic waves in the air. This example will be used initially to explain how a complete Doppler compensation can be effected by means of suitable processing.

The Doppler problem consists of the fact that, as a result of relative movements between the transmitter and receiver, frequency shifts arise, which often cannot be precisely forecast because, for example, the speed of the relative movement is not precisely known. This also means that the phase locations of the information signals cannot be precisely determined any longer either, which means considerable restrictions on all forms of information transmission which use phase encoding. This problem can be somewhat reduced by means of differential phase encoding, in which it is not the phase angle per se which is considered, but only its changes from pulse to pulse, but it is not fundamentally resolved. It is however possible to achieve a near hundred percent Doppler compensation, however, if the individual information components are processed in a suitable manner in each case jointly with the reference component. One advantageous solution comprises a Doppler compensation pair by pair, abbreviated to pDA, which can be put into effect in different ways. One simple possibility is explained in somewhat greater detail in the following example:

By way of example for all other instances, the processing of the first information component is represented here for a time pulse, of which the frequency fik, and consequently also the angular velocity $\omega_{ik}$ is twice as great as the corresponding values $f_b$ and $\omega_b$ of the reference components. Assuming that the reception signal is present in digital form, the signal components issued from the transmitter, send b and send ik, are represented in the following form:

$$\text{send}_b[n] = \sqrt{\frac{2E}{N}} \cos(\omega nt_s + k\omega(nt_s)^2) \quad (1)$$

$$\text{send}_{ik}[n] = \sqrt{\frac{2E}{N}} \cos(2\omega nt_s + k2\omega(nt_s)^2 + \theta_{ik} + \theta_{inf}) \quad (2)$$

where N is the total number of scans made in the given pulse interval, n is the number of the current scan at that particular moment, ts is the length of the time interval in which the scanning is being effected, and, as a consequence, nts is the discrete time, E the energy, $\omega_{ik}$ is the start phase and $\omega_{inf}$ is the angle of the information component used for the encoding, and factor k defines the gradient of the frequency displacement actively created in the proportional VMT.

In general, k can be any desired suitable function of the time, and can assume positive or negative values or even be zero.

Because the phase location of the reference frequency at the transmitter does not change and plays no further part, in equation (1) the value concerned is set as equal to zero.

As a result of the Doppler imposition, the signal components received, empf b and empf ik, are distinguished from those transmitted by an additional element:

$$\text{empf}_b[n] = \sqrt{\frac{2E}{N}} \cos(\omega nt_s + k\omega(nt_s)^2 + \underline{D\omega nt_s}) \quad (4)$$

$$\text{empf}_{ik}[n] = \sqrt{\frac{2E}{N}} \cos(2\omega nt_s + k2\omega(nt_s)^2 + \underline{D2\omega nt_s} + \theta_{ik} + \theta_{inf}) \quad (5)$$

where D is the Doppler coefficient, which contains the ratio of the relative speed between the transmitter and the receiver (with positive sign for mutual approach and negative sign for increasing distance) and the speed of the signal processing in the transmission medium.

On the basis of the underlined elements of these equations, it becomes clear that the Doppler imposition of the two signal components differs precisely by the proportionality factor, which also defines the ratio of the corresponding transmission frequencies. In the present example this proportionality factor equals 2.

Because the proportionality factor is known, therefore, the precise amounts of the phase displacements caused by the Doppler effect in practical terms has no further part to play. Specifically, if the reference component is transformed in such a way that it acquires the same frequency characteristics as the information component which is to be analyzed in each case, exactly the same Doppler shift is derived for both of them. In the present example, a Doppler-identical reference Rf such as this can be created from the reference components by way of multiplication by themselves. According to the multiplication rule, the following is derived:

$$Rf[n] = empf_h[n] \times empf_b[n]$$

$$= \sqrt{\frac{2E}{N}} \cos(\omega w n t_s + k\omega w(n t_s)^2 + D\omega w n t_s) \times$$

$$\sqrt{\frac{2E}{N}} \cos(\omega w n t_s + k\omega(n t_s)^2 + D\omega w n t_s)$$

$$= \frac{2E}{N} \frac{1}{2} [\cos(0) + \cos(2\omega n t_s + k2\omega(n t_s)^2 + D2\omega n t_s)]$$

After filtering away the unnecessary sideband and scaling with the factor $\sqrt{2N/E}$, we finally obtain a normed reference signal Rf′, which differs in respect of the phase from the information component represented in the equation (S):

$$Rf'[n] = \sqrt{\frac{2E}{N}} \cos[2\omega n t_s + k2\omega(n t_s)^2 + d2\omega n t_s] \quad (6)$$

This reference signal can therefore be used, to a certain degree, as a signal-internal clock, with the aid of which the phase angles of the information components can be determined.

In a similar manner, it is also possible for the references required in each case to be developed from the reference components for all other information components contained in the reception signal. The only requirement is that multiplication then takes place several times, and filtering is also applied if necessary. In general, naturally, the information components can also be converted in the same manner, which can prove useful, for example, if, as a departure from the examples chosen here, the frequencies of the information components lie lower than those of the reference components, or do not stand in a whole-number relationship to them. In the latter case, the same procedure can be applied individually for each side of the pairs to be formed in each case from the reference and information components, as often as required until both fractions come into congruence. However, in view of the fact that with each multiplication the number of the frequency components contained in the individual spectrum is increased as a multiple, the effort must be made to locate the channels in such a way that as few steps as possible are required for the pair-by-pair Doppler compensation.

In general, care must also be taken in all applications for phase-encoded signals, with regard to the choice of a suitable procedure for the pair-by-pair Doppler compensation, that during the manipulation of the information components no information loss occurs, due, for example, to ambiguous phase locations.

On the basis of the example given, the possibility will be explained hereinafter as to how, after the signal processing described, it is now possible to determine in a simple manner the phase location of the individual information components. To do this, for example, a breakdown of the relevant information components can be carried out on the quadratur functions of the reference signal Rf′[n] pertaining to it, which is described hereinafter.

Because the reference Rf′[n] in this example is already present in the cosine form, we can write:

$$RfC[n]=Rf'[n]$$

The corresponding sinus square component RfS [n] can then be obtained, for example, by the formation of the first derivation from RfC [n] and the corresponding norming of the amplitude.

We now write for the projection of the information components onto the cosine square components of the reference:

$$CQ = \sum_{N1}^{N2} empf_{ik}[n] \times RfC[n]$$

$$= \sum_{N1}^{N2} \sqrt{\frac{2E}{N}} \cos(2\omega n t_s + k2\omega(n t_s)^2 + D2\omega n t_s) + \theta_{ik} + \theta_{inf} \times$$

$$\sqrt{\frac{2E}{N}} \cos(2\omega n t_s + k2\omega(n t_s)^2 + D2\omega n t_s)$$

$$= \frac{2}{N} \sum_{N1}^{N2} \frac{\sqrt{E}}{2} \cos(\theta_{ik} + \theta_{inf}) +$$

$$\frac{2}{N} \sum_{N1}^{N2} \frac{\sqrt{E}}{2} \cos(4\omega n t_s + k4\omega(n t_s)^2 +$$

$$D4\omega n t_s + \theta_{ik} + \theta_{inf})$$

where N1 is the beginning and N2 is the end of the individual pulse.

In view of the fact that in the second summand the function values oscillate about zero, the positive and negative portions are suspended in the total, so that this element tends overall towards zero, and can therefore be disregarded without any significant error:

$$CQ \sim \sqrt{E} \cdot \cos(\theta_{ik} + \theta_{inf})$$

Accordingly, the following is derived for the projection of the received information components onto the sine square components of the reference:

$$SQ = \sum_{N1}^{N2} empf_{kl}[n] \times RfS[n]$$

$$= -\sum_{N1}^{N2} \sqrt{\frac{2E}{N}} \cos(2\omega n t_s + k2\omega(n t_s)^2 + d2\omega_s n_s t + \theta_{ik} +$$

$$\theta_{inf}) \sqrt{\frac{2}{N}} \sin(2\omega n t_s + k2\omega(n t_s)^2 + d2\omega n_s t)$$

$$= -\frac{2}{N} \sum_{N1}^{N2} \frac{\sqrt{E}}{2} \sin(4\omega n t_s + k4\omega(n t_s)^2 + d4w n_s t +$$

-continued $$\theta_{ik} + \theta_{inf} - \frac{2}{N} \sum_{N1}^{N2} \frac{\sqrt{E}}{2} \sin(-\theta_{ik} - \theta_{inf})$$

$$\gg -\frac{2}{N} \sum_{N1}^{N2} \frac{\sqrt{E}}{2} \sin(-\theta_{ik} - \theta_{inf})$$

$$= \sqrt{E} \sin(\theta_{ik} + \theta_{inf})$$

Hereinafter, let CQ and SQ be regarded as the x and y co-ordinates respectively of a point in the right-angled co-ordinate system. The connecting line between this point and the co-ordinate origin and the abscissa include the phase angle sought Θ. This can now easily be determined with suitable algorithms. An illustrative representational form is, for example:

$$\Theta = \arctan\frac{SQ}{CQ} = \arctan\frac{\sqrt{E}}{\sqrt{E}} \frac{\sin(\theta_{ik} - \theta_{inf})}{\cos(\theta_{ik} - \theta_{inf})} = \theta_{ik} - \theta_{inf}$$

The phase of the received information component is represented here as the difference between the start phase of the transmitted wave and the encoding phase, i.e. within each of the pulses it is invariant against the time. For the sake of completeness, it may be pointed out that the phase difference between the preceding pulse and the current pulse can just as well be used for the encoding. If the pulses are designated with the indices i or i+1 respectively, the following is derived for the differential phase encoding:

$$\Theta^{i+1} = (\theta_{ik} - \theta_{inf}^{i+1}) - (\theta_{ik} - \theta_{inf}^{i}) = \theta_{inf}^{i} - \theta_{inf}^{i+1}$$

By analogy, it is also possible to determine the phase locations of the other information components for each time pulse with a high degree of precision. This in turn offers the user the possibility of correspondingly fine discretisation of the phase angle and therefore of an increase in the information rate. The method described heretofore of phase angle determination is designated hereinafter in general as the CS projection.

FIG. 13 once again illustrates in a general overview the most important elements of the processing flow of the vDK. The overview further shows that a number of the elements described here can also be applied in a similar way in other advantageous embodiments.

2. Channel Purification (KR):

The KR contains the identification of the best channel response in each case, and their separation with regard to signal technology, with the simultaneous minimisation of the intersymbol interactions. It can, in turn, include a partial Doppler compensation, which can already be extended to a series of applications.

We shall now consider as an example the case in which the Doppler effects no longer have a substantial part to play, but in which reception is impaired by the superimposition of various channel responses. Such transmission conditions are frequently encountered in acoustic communication with or between slowly moving or stationary objects under water. Each of the signal components is then represented by a whole spectrum of channel responses (see diagrammatic representation in FIG. 1, FIG. 3 and FIG. 4a). The process according to the invention must now guarantee, in particular, that the intersymbol interactions are minimized.

Figure 4:
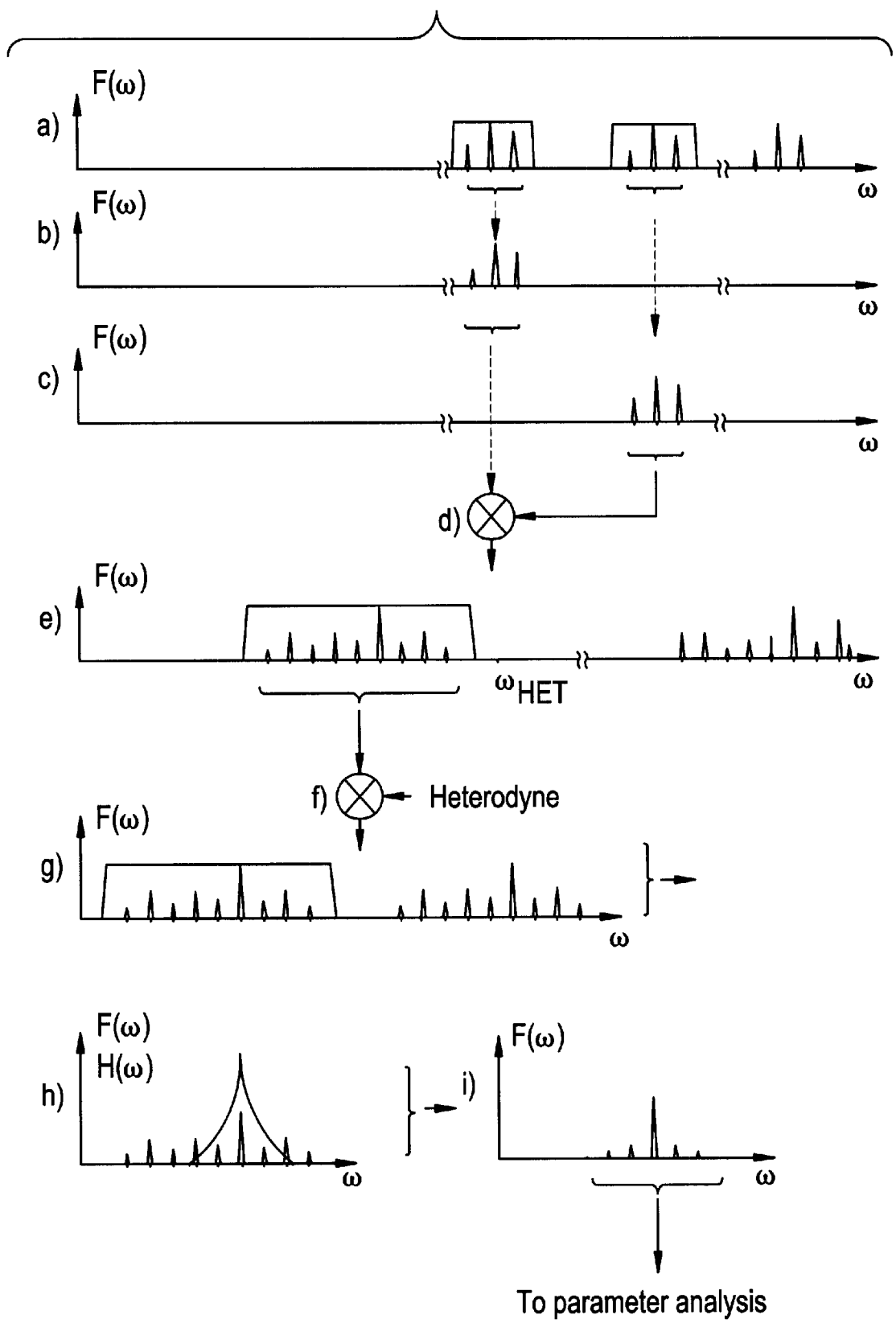
FIG. 4 shows in diagrammatic form a basic variant for the sequence of the process according to the application for signal processing.

After multiplication of the reference components by the information components in each case (FIG. 4d), two spectra are obtained of intermediate frequencies in each case, which are of different values and run at different speeds (FIG. 4e). The possibility pertains of filtering out the lower frequency band in each case, for example by means of a low-pass filter for further processing. In this portion possible Doppler effects are reduced, while they are enhanced in the other spectral portion. If the second sideband does not cause interference, because, for example, sufficient calculation capacity is available, then it can also be carried; i.e. the filter stage can be done away with.

In the next processing stage, the minimum of one frequency band remaining is multiplied by an auxiliary frequency generated inside the system (FIG. 4f), the characteristic of which is selected in such a way that in the result of the multiplication the one portion of the second intermediate frequency is set; i.e. frequencies which relate to this will not undergo any further temporal change (FIG. 4g).

The characteristics of the individual auxiliary frequency in each case (H1; H2; . . . HN) is derived either from the tuning determined or operatively agreed between the transmitter and receiver in respect of the signal structure used for the information transfer, or is determined in the framework of a sampling of the transfer channel (for channel training see below), carried out in the initial part of the information transfer.

This stage can also be reached if in the first instance only the reference component could be separated from the information components. By suitable selection of the heterodyne frequency it is then possible for the frequency of the information components provided in each case for the processing (in the present example, the first) to be stabilized.

One advantage of this procedure lies in the fact that, by means of suitable heterodyne frequencies, the desired portions of the stable intermediate frequencies are always placed inn a defined window and can therefore be optimally filtered out by means of a fixed filter, such as a low-pass filter (FIG. 4h).

Figure 5:
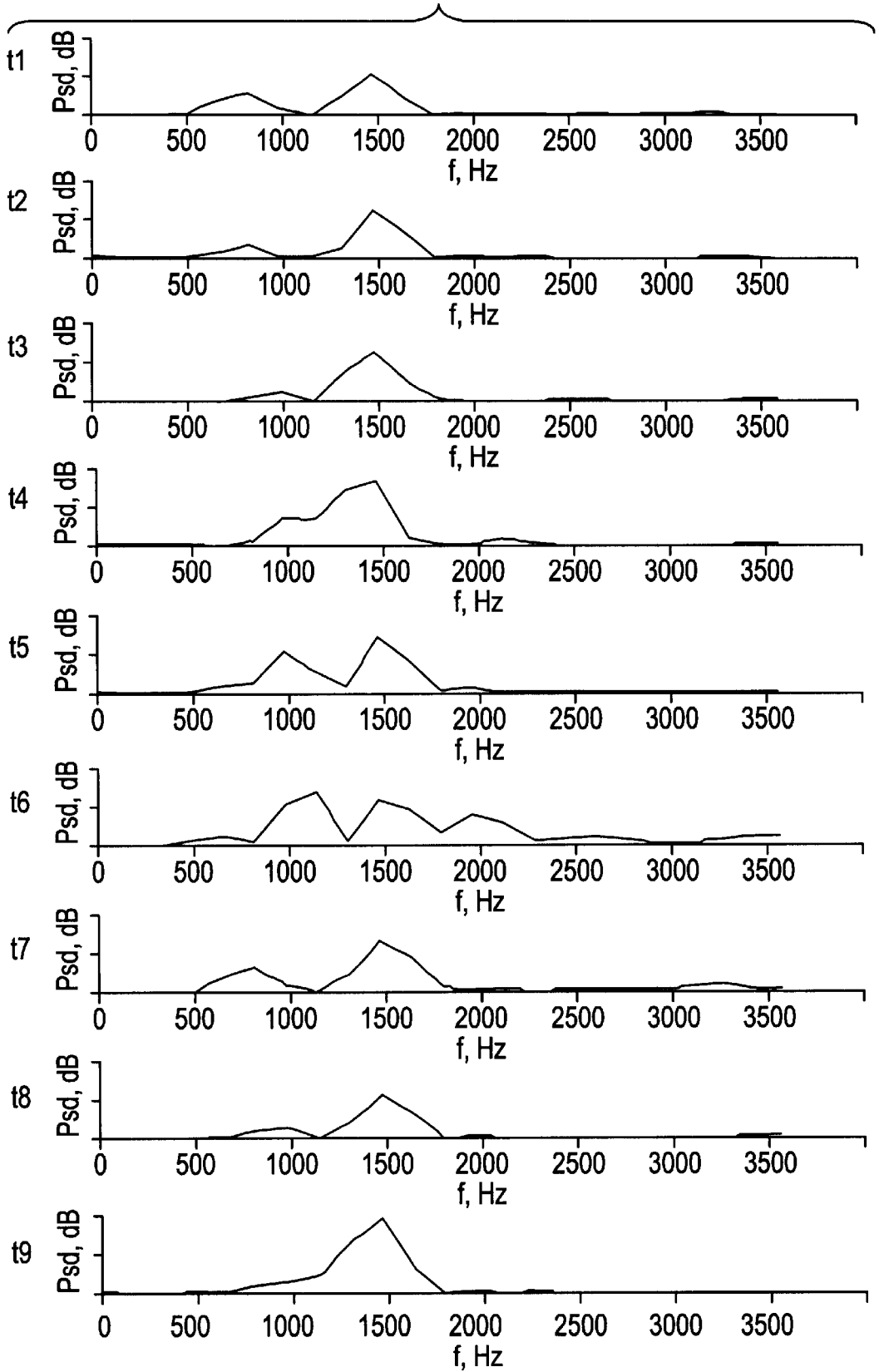
FIG. 5 shows, as an example, that as a consequence of changing multipath components, the strength of the various spectral components of a given reception component may feature substantial temporal fluctuations.

FIG. 5 is intended to show, however, on the basis of an example closely related to actual practice, with a plurality of channel responses, that it is still not possible to make any reliable statements on the basis of such a spectrum of stable intermediate frequencies, of the phase location, for example, since the various different channel responses may be represented with substantial differences at different times.

Accordingly, a second filter stage is inserted, at which, in the process of an ongoing channel training procedure (see below for description), the best possible separation sharpness was set for each component for the strongest channel response overall. The dotted line in FIG. 4h is intended to show that the flanks of this filter can be set as very steep. As a consequence, the influences of the other channel responses can be minimized in the best possible manner (FIG. 4i).

Figure 6:
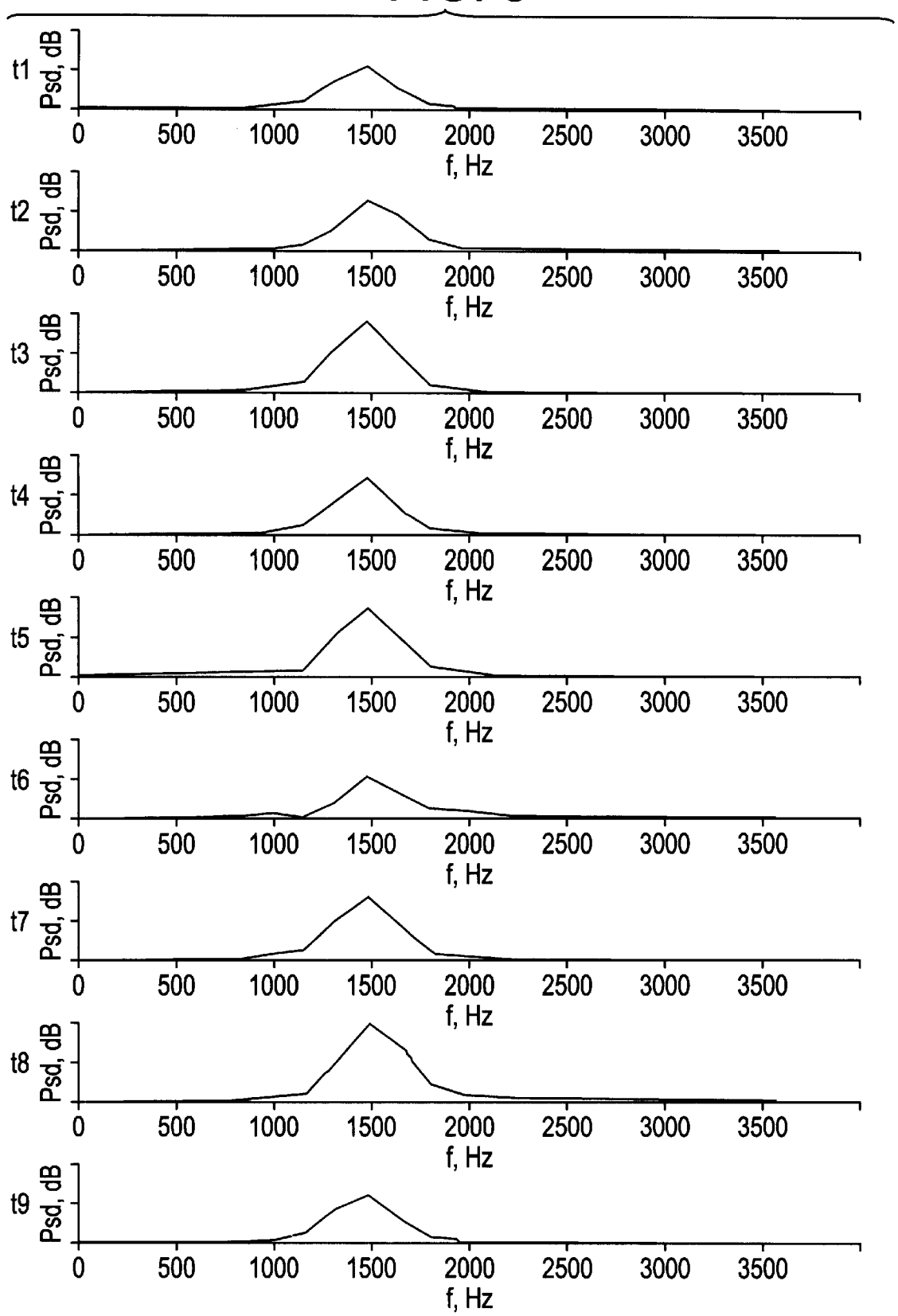
FIG. 6 shows the example already represented in FIG. 5, after passing the sharp filter stage.
Figure 7:
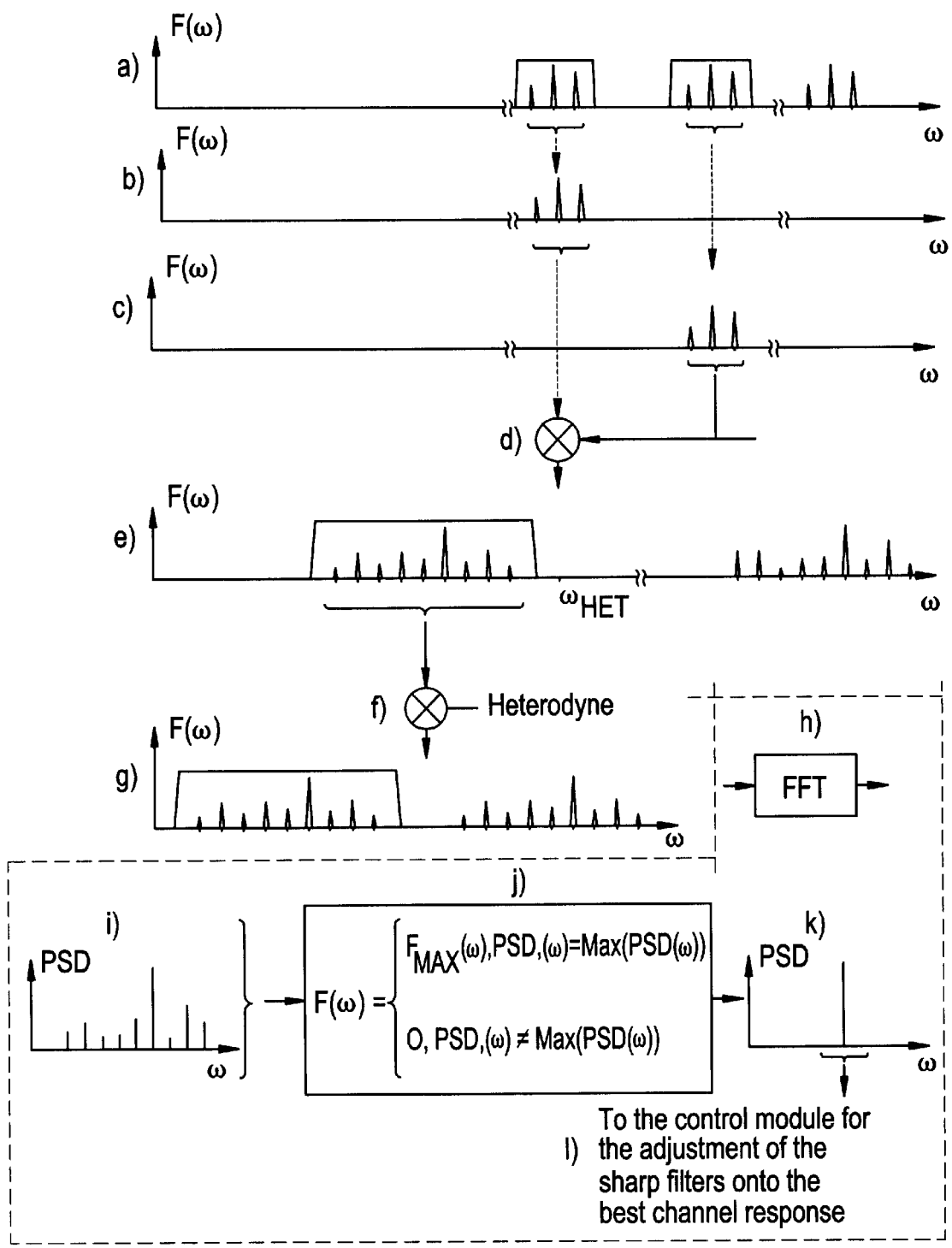
FIG. 7 shows in diagrammatic form the sequence of a basic variant of the process according to the application, for which a channel tuning procedure is being carried out.

FIG. 6 shows, for the example closely related to actual practice, that in the result of such a sharp filtering process from the plurality of the channel responses, still fluctuating in FIG. 5, an unambiguous selection can be made and the influence of the other portions can be suppressed. The entire process described in this connection can be designated as channel purification with partial Doppler compensation.

Parameter Determination

The signal components, purified to the greatest possible extent of interfering channel influences processed as such, can mow be subjected to a detailed parameter analysis. In this context, both the amplitudes as well as the phases of the signal portions carrying the information can be determined with the greatest possible precision and reproducibility.

Different amplitude values can be differentiated, for example, in a simple manner by means of threshold value switches. In the event of it being intended that a C-S projection should be carried out to determine the phase angle, it is possible, if appropriate, for reference oscillations required (or their sine and cosine portions) to be generated artificially. The latter is technically not a problem, since the system is aware of the settings of the last (sharp) filter stage, and therefore the frequencies of the signal portions carrying information. Depending on the encoding form used, however, it is also possible for the user to select and implement the best suited from the broad repertoire of known algorithms.

In the form described above, the KR can be used for preference in conjunction with a pVMT (see FIG. 1). It can, however, also be adapted without any problem to the paVMT (see FIG. 3). In the case of the paVMT, the multiplication of the reference and information components leads directly to steady intermediate frequencies, so that, if appropriate, the multiplication with auxiliary frequencies becomes superfluous. Should such an intermediate step nevertheless be to the purpose, for example in order to displace the frequency band concerned into a specific filter window, this can easily be done by multiplication by one constant auxiliary frequency in each case. This lies, however, within the room for manoeuvre of the foregoing description.

The KR is therefore basically suitable for all forms of the VMT in which the gradient of the actively generated frequency change does not equal zero. In order to distinguish the variant described here from the following modifications, it will be designated as KR1. The most important elements of this basic variant are represented again in the overview in FIG. 13.

The modification of the KR described above can for example be modified in such a way that the reference and information components are initially not multiplied by one another. In this case, the formation of stable intermediate frequencies takes place directly in one stage, by multiplication of the individual signal components in each case with a suitable auxiliary frequency in each case. This procedure provides the advantage that the spectra of the stable intermediate frequencies do not have more elements than the reception components. After filtering out the best channel response for each component in each individual case (channel purification), there is always still the possibility of processing the signal portion carrying the information with the reference, in order to achieve at least a partial Doppler compensation, or, by analogy with the example described with the vDK, to carry out a phase angle determination by means of C-S projection of the components carrying the information onto the cosine and sine components of the purified reference signal. The corresponding frequency adaptation of the reference can, if required, be effected either in the course of the multiplication with a suitable auxiliary frequency, or, after the conclusion of the last filter stage, by multiplication with a suitable constant auxiliary frequency in each case. In the second instance, the reference component only needs to run through the filter once.

With the modifications described in the preceding paragraph, a further advantageous embodiment is derived. The diagrammatically simplified sequence plan has been designated in the overview representation (FIG. 13) as KR2.

However, if Doppler effects do not play any part at all, the reference components can even be left out altogether, or used as additional information components. In that case, only KR2 is usable. The parameter determination must however then be effected in an analogous manner to the procedure described for KR1.

For the sake of completeness, reference should also be made here once again to the alternative solution described at the outset but not pictorially represented, with which, for example, in the framework of the pVMT the stage of the stable intermediate frequencies can also be achieved even without prior separation of the components, solely by multiplication of the signals received in sequential pulses. This step likewise contains a partial Doppler compensation. As a special feature in this case is the fact that, depending on the frequency stroke, the spectra of the stable intermediate frequencies of the channels concerned are located in separate windows, which are, however, more or less closely adjacent to one another. In the result of such a transformation, however, a very complex signal structure is obtained. In particular, if a considerably large number of information channels are used, careful attention must be paid to the avoidance of possible superimpositions of the cross products. To separate the channel responses, use may be made, for example, of a cascade of sharp filters.

Finally, reference should again be made to the fact that with the description of the filter systems, it is only intended to illustrate the basic principle of the procedure. In practice it is entirely conceivable that more complex methods of signal processing and signal analysis can be used, which implicity involve the operational stages described here in a similar or other form. The principle in any event remains the same.

Complete Solutions

Once the basic principles of the technical procedure for the complete Doppler compensation and different variants of channel purification have been separately described (in part, including a partial Doppler compensation), an instance of application may now be considered, in which the reception is impeded both by various channel responses as well as by strong Doppler effects. Such a combination of interference elements frequently renders difficult, for example, communications with or between moving objects under water.

For this situation, a possible solution consists, for example, of combining vDK and KR2 with one another:

After separation of reference and information components, first, as described with the vDK, a Doppler compensation is carried out pair by pair, inasmuch as at least one of the signal components to be considered in pairs, or even both if appropriate, is/are transformed in a suitable manner in such a way that both feature exactly the same frequency cycle, and are therefore have an equally heavily Doppler burden. Optionally, the sidebands not required in each case can be filtered away and the remaining signal portions normed once again.

Both components are then separately multiplied by multiplication with typically the same auxiliary frequency (which has the same gradient as the components concerned, but is displaced approximately parallel), and are therefore transferred in stable intermediate frequencies and then in each case subjected separately to the following filter stages for purification. To do this, the sharp filters can, if applicable, be individually adjusted for each component. In the ideal situation the filter settings concerned can also be taken into account in the fine tuning of the auxiliary frequencies referred to.

In the result, a signal is obtained in each case which is purified to the greatest degree of intersymbol interactions, both for the information components as well as for the reference. After this "purification" (if applicable, including threshold value analysis), the parameter determination can then be effected, for example, in accordance with the procedure described for the vDK or KR2, whereby, by means of the pair-by-pair processing of the individual information components with the reference pertaining to them, complete Doppler compensation is achieved.

Figure 13:
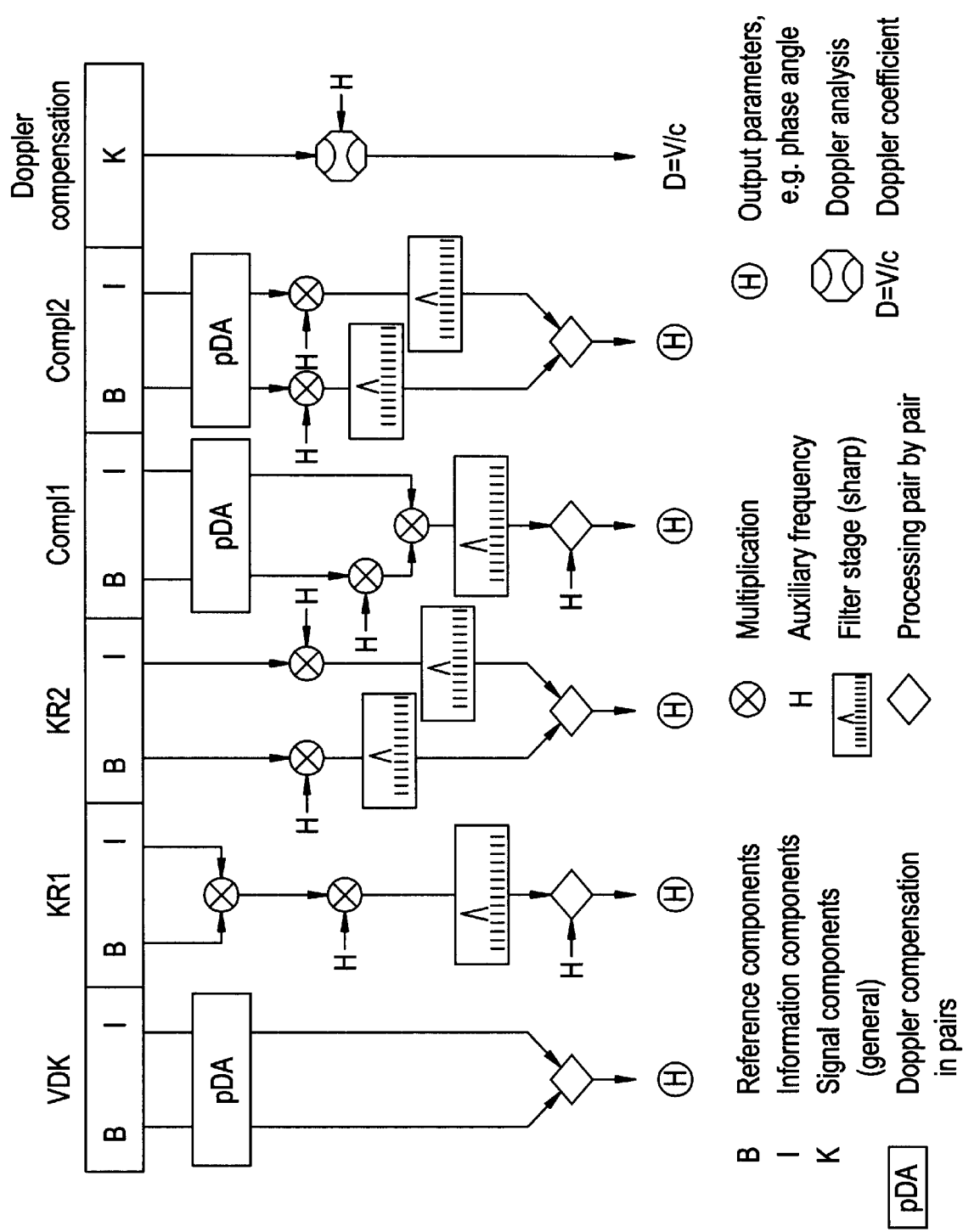
FIG. 13 shows a diagrammatic overview of the most important processing stages with different advantageous embodiments of the procedure for signal processing.

In the diagrammatic overview in FIG. 13, this has been designated as Komp. 1.

A further possible solution consists of a suitable combination of vDK and KR1 (see simplified representation of the sequence plan of Komp1. 2 in FIG. 13).

In this case too, after the separation of reference and information components, the pair-by-pair Doppler compensation is carried out next. Thereafter, one of the two components is displaced parallel by a suitable amount, by multiplication by an auxiliary frequency generated in the system, but in this case constant. Both partner components are then multiplied by one another, whereby the processing stage shown in FIG. 4g, i.e. the plane of the stable intermediate frequencies, is reached. The process is then continued with the two filter stages and the parameter determination according to KR1.

The second complete solution consists of the fact that, by the projection of the information components onto the reference which is Doppler-identical, the influences of frequency displacements incurred by movements are completely eliminated. This, however, causes the reference to be "used up"; it is, however, no longer required. A major advantage of this process lies in the fact that, inside the system, only one constant auxiliary frequency needs to be generated in each case in order for the desired sideband of the stable intermediate frequencies to be arranged exactly in the optimum frequency window for the filtering. In the most favourable case, it might be possible for one and the same auxiliary frequency to be used for all component pairs. In principle, the possibility pertains of using this auxiliary frequency, following on from the "purification" also as a reference for the phase analysis. However, because in practice the effort is made to adjust the sharp filters for each signal component (which in the present case already incorporate a correspondingly processed combination of the individual information and reference components), the filter settings are therefore known to the system, and it is possible without any problem for references matched precisely to this to be artificially produced inside the system (including the sine and cosine square components), if these are required for the phase analysis (see KR1).

Channel Training and Channel Tuning

By means of the technique of channel training which has already been mentioned several times, it is first to be ensured, on the basis of suitable test signals, that the signal structure is adapted as best possible to the transmission conditions in each case and/or it is at least guaranteed that the receiver can always carry out the component separation in the required degree. If this precondition is fulfilled, the channel tuning is carried out, which is absolutely to be recommended for the process according to claim 1 as well as for all further variants which contain a channel purification process. For this purpose, an option which can be used is to send somewhat longer signals without encoding, which, however, already possess the characteristics provided for the signal transmission. In this context it is at the discretion of the user whether all the frequency channels are used simultaneously, or whether the channel tuning is carried out on the basis of test signals, which in each case contain, one after another, a reference component and one or more information component(s). The individual procedure must of course be matched to the variant of the signal processing procedure selected accordingly. The test signals received now run through all the processing stages provided for in the variant concerned, up to the formation of the stable intermediate frequencies. On this level, an analysis is carried out individually for each of the signal components provided for the evaluation (or the mixed components formed from the individual information and reference components in each case), of the energy density distribution in the given frequency spectrum. For such an analysis, an FFT can be used, for example. On the basis of these evaluation results, the best suited channel response in each case (typically the richest in energy) is selected, for which what is now the best possible setting in each case of the "sharp" filters is carried out and stored. Once the relevant settings for all the components has been determined, the actual information transfer can begin. The filter settings are then retained until the next channel tuning.

With acoustic data transfer under water in particular, the transmission conditions are often not temporally stable. In such cases, one possibility is to repeat at least the channel tuning at suitable time intervals, i.e. to update the settings of the sharp filters on a regular basis.

The use of longer encoded signals for the channel tuning does offer good statistical reliability, but it also means that the information transfer must be briefly interrupted in the meantime. Such interruptions can, however, be avoided. One advantageous alternative is offered by the process in which an identification of the most favourable reception components in each case is continually effected and/or an updating of filter settings on the basis of a suitable analysis of the spectra of the standing intermediate frequencies. In this situation, while the data transfer is operative, i.e. on the basis of the ongoing signals being received, in parallel with the actual signal processing procedure or as a constituent part of it, an ongoing updating of the filter settings referred to is carried out, and therefore an ongoing channel tuning. To do this, it is to the purpose for the reception results from several pulses to be incorporated into the calculation. Such an alternative solution does naturally impose high demands on the evaluation system.

Determination of the Relative Speed Between Transmitter and Receiver

It should next be shown that it is possible to derive from the reception signal an indication which may be helpful in respect of the current change in distance between the transmitter and the receiver. Signal processing in accordance with the procedure described above is aimed at reconstructing in the best possible manner the (transmission) parameters (inter alia the phase angle) for each signal component. To achieve this it was to the purpose for the components to be processed with one another in such a way that the Doppler portions are eliminated. These are dealt with as interference values. These Doppler portions, however, contain an item of information in the form of the Doppler coefficient $D=v/c$ (see Equations 4 and 5) which may indeed have nothing to do with the actual data transfer, but can provide an indication of the relative speed v between transmitter and receiver at a particular moment. The Doppler coefficient can be determined by means of suitable signal processing methods. Because the speed of the signal propagation c is approximately known, or can be measured in the framework of the channel sampling, v can be estimated or even determined with a relatively high degree of precision.

It may be of advantage for many applications if this advantageous additional information can be obtained without additional measurement effort.

It may further be noted that the knowledge of the Doppler portions can also contribute to the further improvement of the actual signal processing. It is thus possible, for example, for the auxiliary frequencies generated within the system within the framework of the KR to be tuned more precisely to the structure of the individual reception components in each case, and so reduce the Doppler effects, unwanted in the actual signal analysis, in an even better and simpler manner. By the integration of such measures, and if applicable by their repeated application, it is also possible, in addition to an improvement in the evaluation results, to achieve at least in the interim an optimisation of the process, since with the increase in the Doppler resistance the possible areas of application of KR1 and KR2, for example, can also be extended. This means that, at the multiplication of reception components with one another, unavoidably rapid data growth can be reduced, it may be possible to do away with intermediate filters, and the sequence as a whole can be made more rapid. All the simplifications in the core area of the process are to the benefit of the online evaluation. Even if the Doppler evaluation initially requires additional effort, it is possible for overall savings to be achieved, since the core routines of the signal processing can then be managed, if appropriate, with a lesser hardware and software capacity.

In addition to this, these latter improvements and simplifications of the process according to the application can at least in the interim also be brought to realisation in a simple manner, if the information about the current Doppler shift in each case is provided in an already prepared form, for example by way of an external measuring system.

Figure 15:
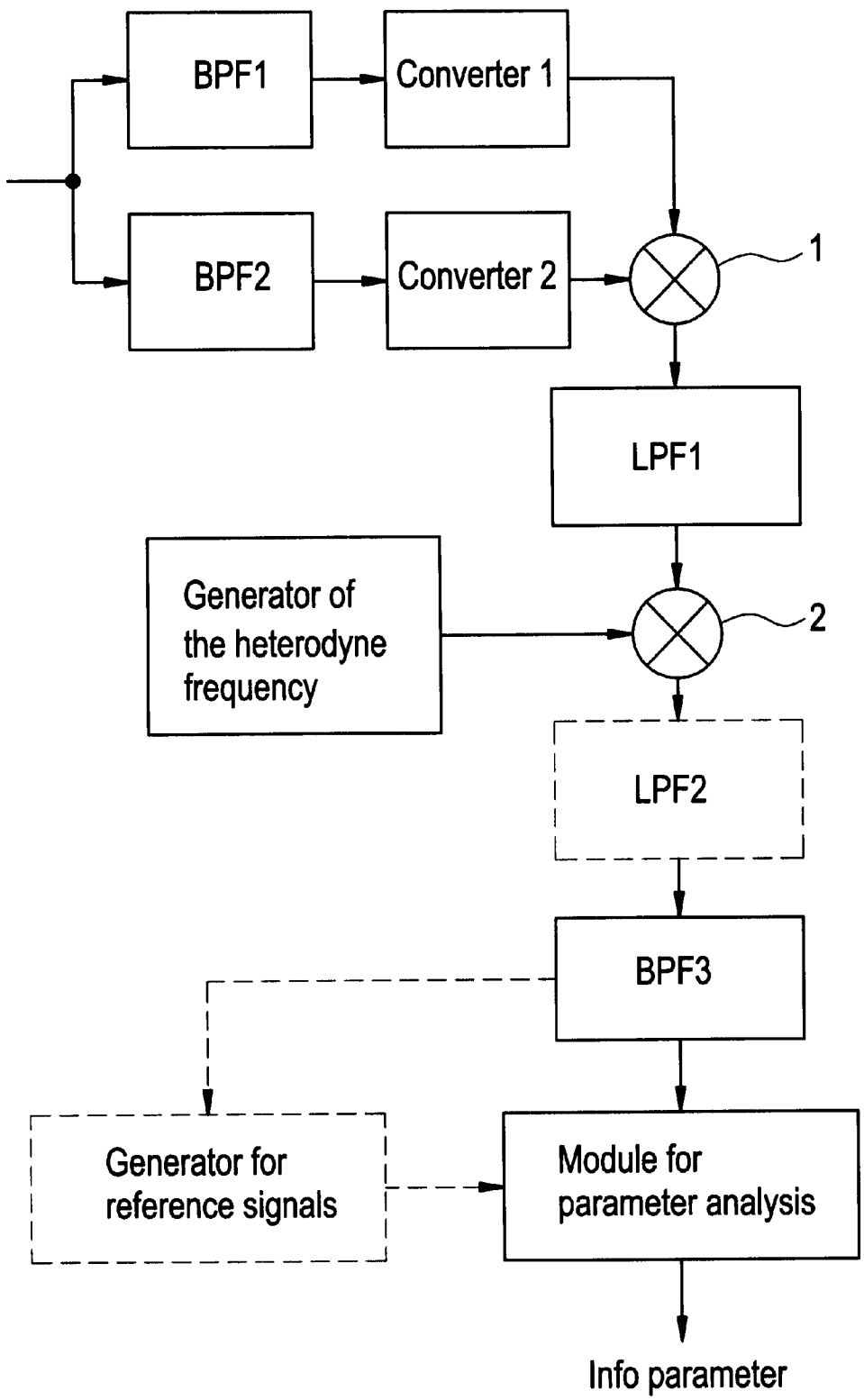
FIG. 15 shows a basic structure of a system according to the application for signal processing of a third embodiment.

In FIG. 15 the basic structure of a signal processing unit is shown. The basic principle features a filter unit, which in this embodiment consists of two filter elements BPF1 and BPF2, connected in parallel and capable of being controlled, which divide the reception signal into reference and information components.

These two signal portions are then conducted, in accordance with the media for frequency conversion, initially to a converter unit consisting of converter1 and converter2, in which a Doppler compensation takes place pair by pair, before both portions are then purified by means of the multiplicator 1, in order then later to be transferred into stable intermediate frequencies by means of a suitable auxiliary or heterodyne frequency delivered by a generator.

As media for the suppression of interference elements, in this embodiment use is made in the first instance of the filter LPF1 and, if appropriate, also a second filter LPF2, which in each case are connected in sequence downstream of the multiplicators and filter away unnecessary sidebands. Next, by means of the sharp filter BPF3, connected in series, the readout takes place of the best-suited signal portion in each case, which is then passed on to the media for parameter analysis, in this embodiment a parameter analysis module. If required, the parameter analysis module can be supplemented by a generator for reference signals, which is connected to BRF3.

The signal parameters for the encoding are then output at the end of the processing unit for each of the information components.

Figure 16:
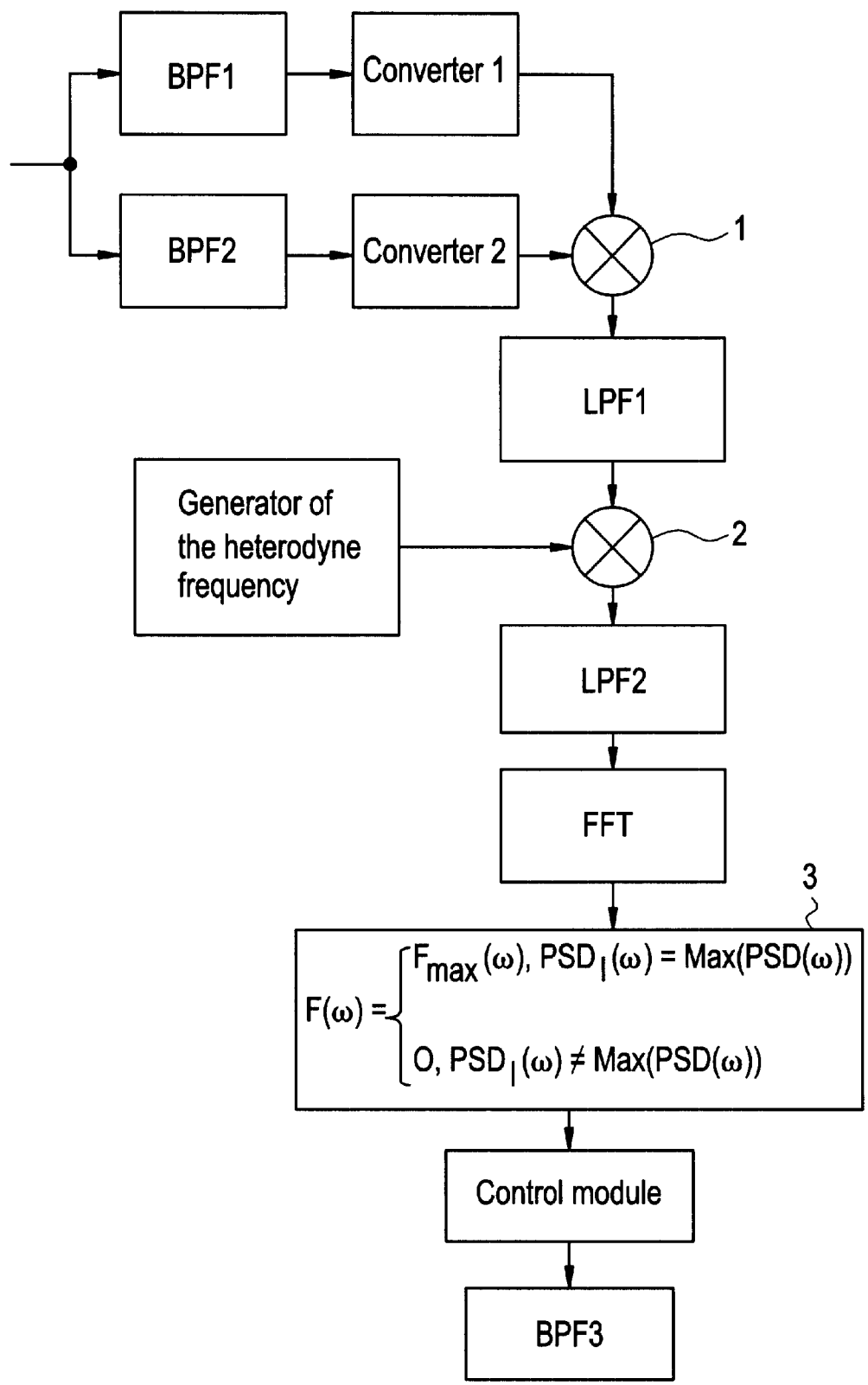
FIG. 16 shows a basic structure of a system according to the application for the channel tuning.

FIG. 16 shows a basic layout for the channel tuning which can be used to advantage in the same context. By distinction from FIG. 15, in this embodiment the signal components are conducted, following LPF2, to the media for tuning, at which, in this case, an FFT unit forms the module for the analysis of the frequency spectra and the unit designated as 3 forms the evaluation. The result is then conducted to the control module, which undertakes the optimum filter settings for BPF3 in each case.

Figure 17:
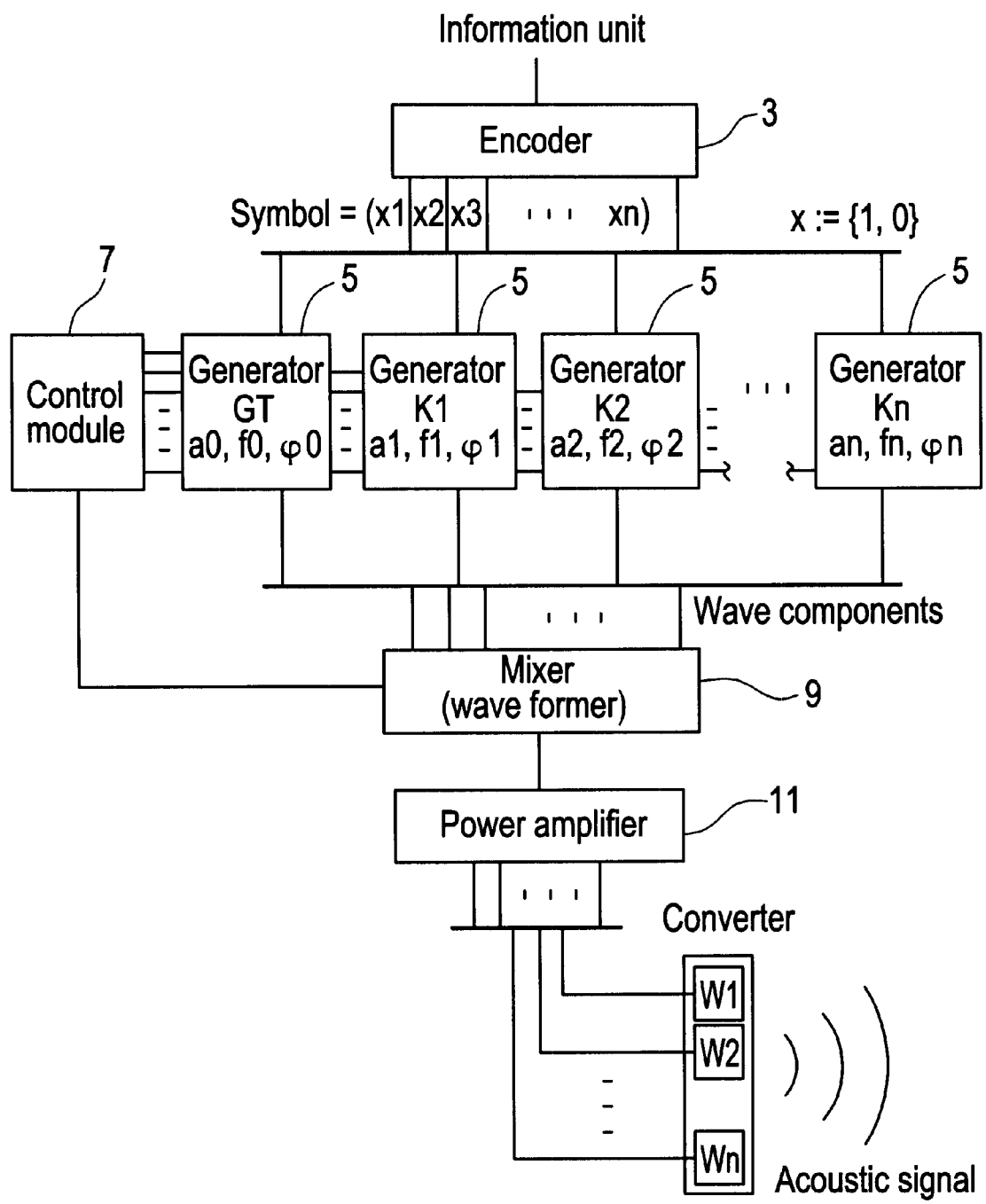
FIG. 17 shows a basic structure of a transmitter unit of the system according to the application.

FIG. 17 shows the basic structure of a transmitter unit for information encoding. The basic principle features an information unit, which conducts the information to be encoded to an encoder 3. The encoder encodes the information delivered by the information unit into an encoding required in accordance with the frequency channels consisting of reference frequency channel and information frequency channel, and leads the encoded information, accordingly to the media for creating a reference frequency channel and to at least one information frequency channel in the form of generators 5, which are actuated by a control module 7. The wave components created by the generators, with given amplitude, frequency, and phase, are passed to a mixer 9, which in turn is actuated by the control module 7.

According to this embodiment, the information signal generated in the mixer is conducted, if required, to a power amplifier 11, which then conducts the information signal accordingly to the converter or converter cascade, which is adapted to the transmission medium.

According to this embodiment, a generator is provided for each frequency channel.

Figure 18:
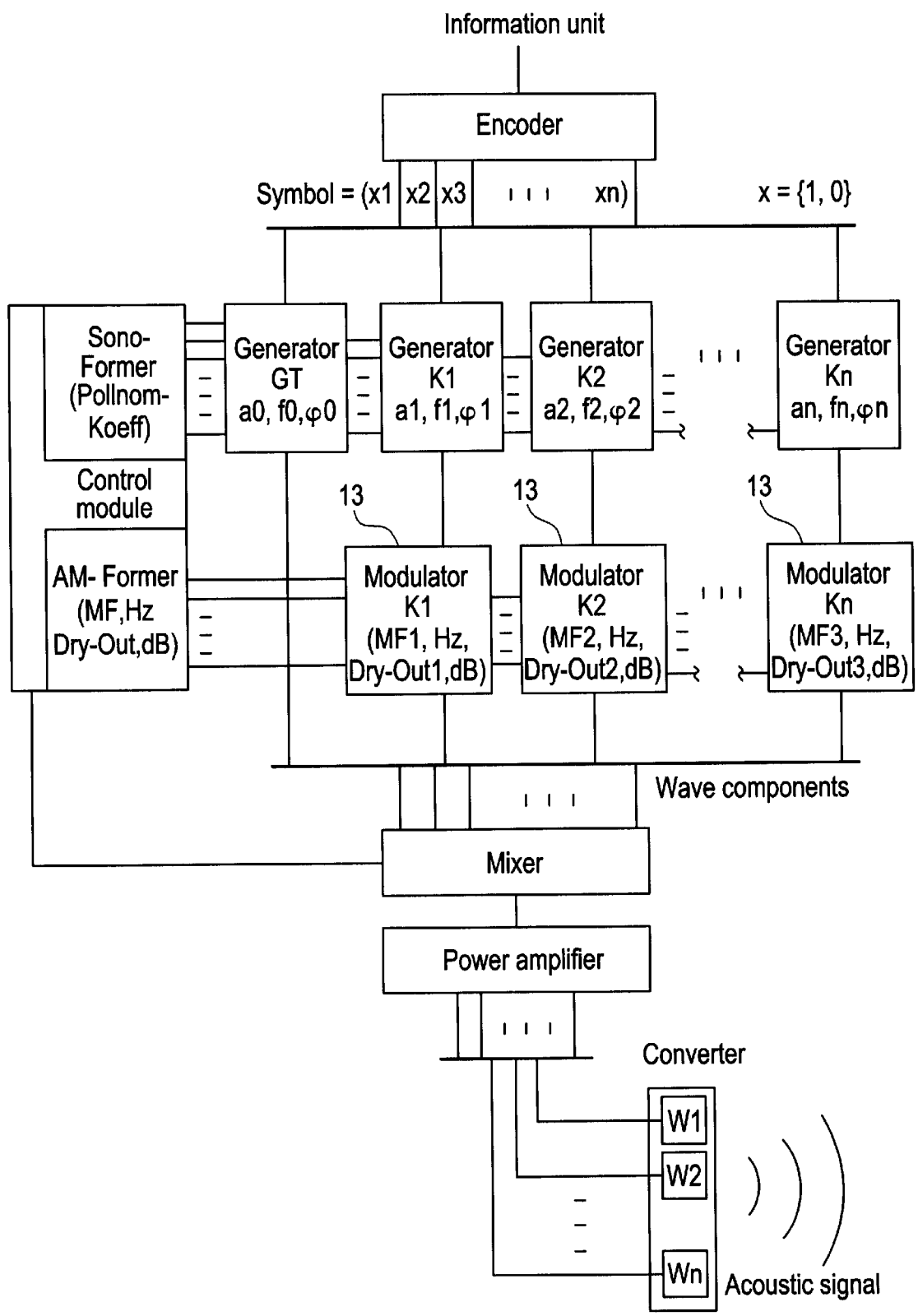
FIG. 18 shows a further basic structure of a transmitter unit with amplitude modulation of the system according to the application.

The embodiment shown in FIG. 18 of a preferred transmitter unit is represented if it is intended that an amplitude modulation is to be carried out in respect of the information signal. For this purpose, before the information signal, broken down into individual components in respect of the reference frequency channel and the information channels is conducted to the mixer, the signal is conducted, for example, to a modulator in each case for each information frequency channel under the actuation and control of the control module.

Figure 19:
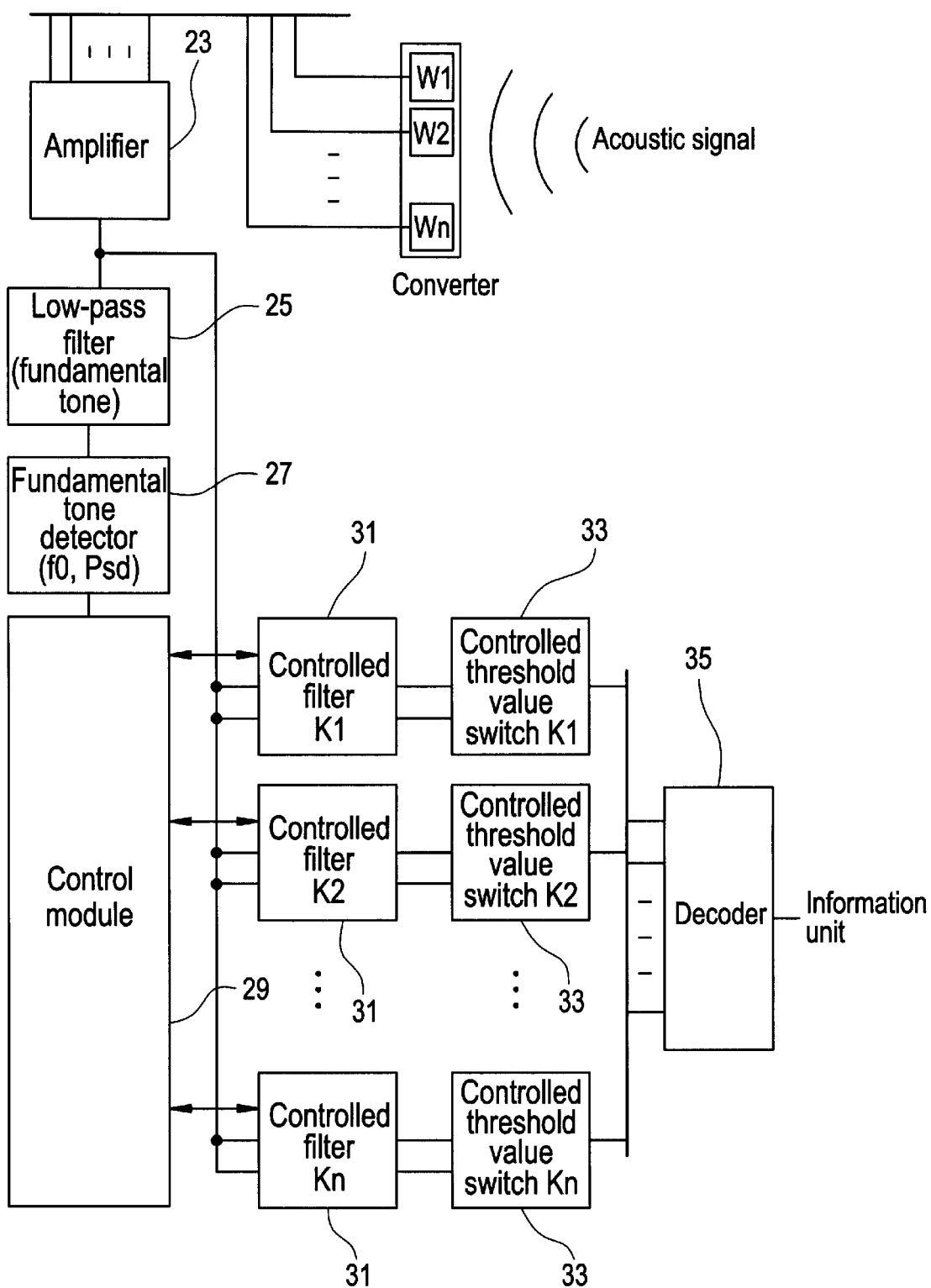
FIG. 19 shows a basic structure of a transmitter unit of the system according to the application, according to a first embodiment.

FIG. 19 shows an embodiment of a receiver unit of the system according to the application. A converter or converter cascade adapted according to the transmission medium accepts the incoming information signal, which in FIG. 19 is shown as an acoustic signal, and conducts it to an amplifier 23. Behind the amplifier is a filter 25 for the separation and analysis of the individual frequency channels and in particular for filtering out the reference frequency channel. The signal coming from the filter, for preference a low-pass filter, is conducted to the reference frequency detector 27, which determines the reference frequency and the reception strength. This data is sent to the control module 29 of the receiver unit. In parallel with this the information signal is taken up before entering the low-pass filter 25, and conducted to the controllable filters 31 for the individual information frequency channels. The signals outgoing from the filter are analysed in a controllable threshold value switch 33 and conducted to a decoder, which decodes the original information.

Figure 20:
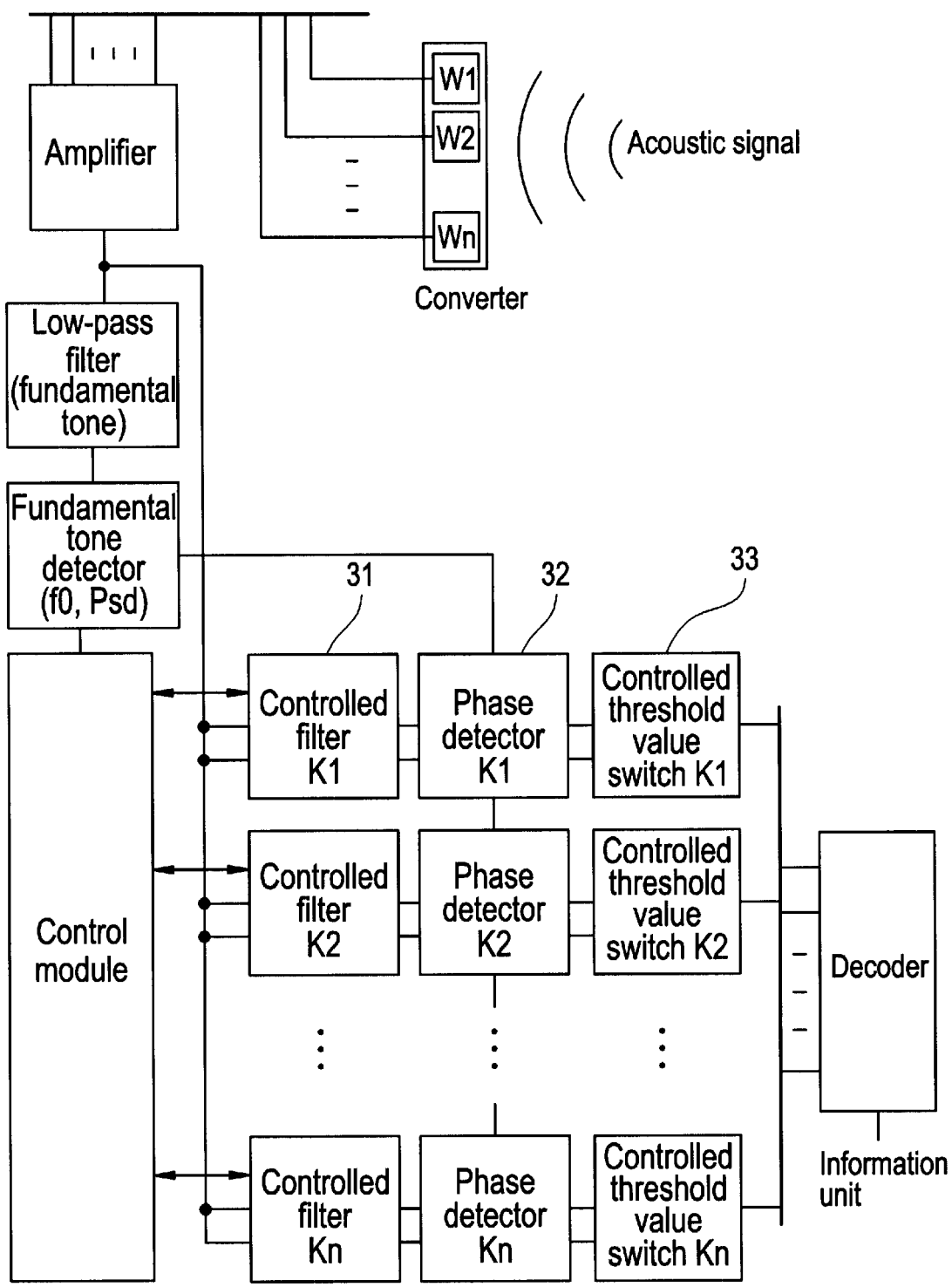
FIG. 20 shows a further basic structure of a transmitter unit with additional phase detection according to a second embodiment.

FIG. 20 shows a further embodiment, which additionally features phase detectors for the proportional or non-proportional phase-velocity method or the phase difference method, for example. For the analysis of the phase components, the phase detectors 32 are arranged between the controllable filters 31 and the controllable threshold value switch 33, arranged for preference according to the number of the information frequency channels to be analyzed, whereby, for the phase determination, the reference frequency is taken up as a reference at the fundamental tone detector.

Further possibilities or applications of the process according to the application and of the system according to the application are described in detail hereinafter.

As a further option, in this process, with the reduction of the distance between the transmitter and receiver, it is possible without any problem for other frequency channels to be used, lying between the original frequency channels or even higher frequency channels, or to displace the entire spectrum in the direction of higher frequencies. In this situation, it is also possible to make use of the effect that, with a reduction in the transmission distance, as a rule the interference influences also recede. To achieve this, transmitter and receiver need only be designed for a correspondingly wide frequency spectrum and equipped with the capability of also converting their encoders accordingly. On the part of the receiver the recognition of possibly new incoming frequencies can either be effected automatically, or the change to a new operating regime can be notified to the receiver by the transmitter in an appropriate manner (e.g. with the last information package). The individual tone channels must however lie sufficiently far apart from one another that they can readily distinguish the transmission conditions in each case from the receiver. Conversely, increasing the distance may make necessary a shift in the entire spectrum to lower frequencies or the surrender of the upper channels or even (in particular with increasing interference influences) an increase in the distances between the channels by proportional drawing apart or omission of intermediate stages.

Because of the high variability of the system, it is also possible that other properties of the transmission path may be exploited. Frequently, for example, as a result of layered inhomogeneities of the water, certain transmission channels are formed which have their own oscillation behaviour. Depending on the characteristic eigenvalues concerned, it is possible for different modes to be easily excited, which may as a rule have relatively low frequencies, but in compensation can carry very far. In principle, the possibility pertains of the frequency bands of the transmission system to be tuned to these modes. In addition to this, transmitter and receiver must, however, understand one another in a suitable manner.

If the relative speed between the transmitter and the receiver is so low that the Doppler effects are negligible, it is possible, as an alternative to the proportional FGM referred to earlier, to carry out uniform frequency changes for the entire system. In this case, a certain "offset curve" or, expressed in terms of images, a "melody" is specified or determined after analysis of the particular transmission conditions in each case, and all the frequency channels added to it (see FIG. 9). This method is designated as parallel FGM. The special feature of this method lies in the fact that, as a result of parallel displacement the same gradient is always derived for all the frequency channels, i.e. the same drift rate, as a result of which, in the ideal situation, an optimum separation of the actual signals from the interference components can be achieved over the entire spectrum.

An additional clock related amplitude modulation can be used for avoiding phase shifts at the clock transitions (so-called glitching). Accordingly, the transmission quality can be further improved.

It goes without saying that, as well as various other parameters, the frequency-related speed characteristic of the individual transmission channel can also be determined by special samplings or in the process of reciprocal communication, and can, and indeed should, be taken into account in the signal generation.

What is claimed is:

1. A process for the transfer of information comprising:
    generating at least one information signal (IS) which includes at least one reference component (BK) and at least one information component (I1; I2; . . . ; IN),
    causing at least one of the components to have a temporally continuous frequency change during the transfer,
    forming discrete states of the reference component (BK) and the information component (I1; I2; . . . ; IN) for the provision of a bit pattern, and
    transferring said at least one component with frequency change into constant intermediate frequencies,
    selecting the best suited signal components from the spectrum of the constant intermediate frequencies
    separating the best suited signal components as constant frequencies from interference portions,
    evaluating the best suited signal components with regard to the relevant information parameters, and
    processing the information signal after reception, by separating the reference component (BK) from the at least one information component (I1: I2; . . . ; IN), wherein
        the reference component BK is transferred into a transformed reference component BK' and the at least one information component I1; I2; . . . ; IN is transferred into a transformed information component I1'; I2'; . . . ; IN'; and
        the signal parameters relevant for the information encoding are determined on the basis of the projection of I1'; I2'; . . . ; IN' onto the sine and cosine components of the BK' in each case.

2. A process according to claim 1, in which both the at least one reference component as well as the at least one information component have a temporally continuous frequency change during the transfer, and a defined frequency interval is determined between the reference and information components in accordance with a predetermined time function.

3. A process according to claim 1, in which the frequency of said at least one reference or information component continually increases in a transfer interval.

4. A process according to claim 1, in which the frequency of said at least one reference or information component continually decreases in a transfer interval.

5. A process according to claim 1, in which gradients of the frequency change are adjusted as a function of position of the interference frequencies relative to individual frequencies of the components in each case, to minimize intersymbol interactions and/or suitable frequency drifts, to avoid disadvantageous mutual overlaying of several transfer systems.

6. A process according to claim 1, in which the initial frequency of the components varies from transfer interval to transfer interval.

7. A process according to claim 1, in which the ranges in which frequencies are varied, so that frequency bands of two or more components overlap.

8. A process according to claim 1, in which the bit pattern is determined by variation of frequency, amplitude, and/or phase angle or dynamic phase characteristic, in a selected time clock.

9. A process according to claim 1, in which the number of the information components (I1; I2; . . . ; IN) changes as a function of the transfer path.

10. A process according to claim 1, in which the reference component (BK) and the at least one information component (I1; I2; . . . ; IN) are formed as a sound wave or as an electromagnetic wave.

11. A process according to claim 1, in which processing takes place pair by pair of the reference component (BK) and an information component (I1; I2; . . . ; IN).

12. A process according to claim 1, in which the information components and the reference component, or the reference components and information components processed in pairs, is transferred in constant intermediate frequencies by multiplication with auxiliary frequencies.

13. A process according to claim 1, in which, a channel tuning is carried out at specific time intervals.

14. A process according to claim 1, in which, during the information transfer, an identification of the most favourable reception component and/or an update of the filter settings is continually carried out, on the basis of a suitable analysis of the spectra of the standing intermediate frequencies, as a result of which a continuous channel tuning takes place without interruption of the actual information transfer.

15. A process according to claim 1, in which transfer-induced Doppler frequency shifts are determined, for preference system-internally, and are taken into consideration in the generation of the auxiliary frequencies.

16. A process according to claim 1, in which the reference component is converted by suitable transformation into a Doppler-identical reference component (RF) with the information component which is to be processed in each case, in such a way that the multiplication of the two components produces a frequency-constant signal.

17. A process according to claim 1, in which
   a) the transformed information component (I1'; I2; . . . ; IN') is multiplied to produce a first value (CQ);
   b) the transformed information component (I1'; I2'; . . . ' IN'); is multiplied with the temporally-derived reference component (RF) for the production of a second value (SQ); and
   c) a quotient is formed between the first and the second value, in order to obtain a temporally-invariant final value which depends only on temporally-invariant information parameters.

18. A process for the transfer of information comprising:
   generating at least one information signal (IS) which includes at least one reference component (BK) and at least one information component (I1; I2; . . . ; IN), causing at least one of the components to have a temporally continuous frequency change during the transfer,
   forming discrete states of the reference component (BK) and the information component (I1; I2; . . . ; IN) for the provision of a bit pattern, and transferring said at least one component with frequency change into constant intermediate frequencies,
   selecting the best suited signal components from the spectrum of the constant intermediate frequencies,
   separating as constant frequencies from interference portions,
   evaluating with regard to the relevant information parameters, and wherein
      at least one reference component (BK) is located in a separate frequency band.

19. A process for the transfer of information comprising:
   generating at least one information signal (IS) which includes at least one reference component (BK) and at least one information component (I1; I2; . . . ; IN),
   causing at least one of the components to have a temporally continuous frequency change during the transfer.
   forming discrete states of the reference component (BK) and the information component (I1; I2; . . . ; IN) for the provision of a bit pattern, and
   transferring said at least one component with frequency change into constant intermediate frequencies,
   selecting the best suited signal components from the spectrum of the constant intermediate frequencies,
   separating as constant frequencies from interference portions,
   evaluating with regard to the relevant information parameters, and wherein
      for preference in conjunction with a proportional change of the frequency channels, constant intermediate frequencies are created by the processing in pairs, in particular by multiplication, of the signal received in the current time pulse with the reception signal of a proceeding pulse.

20. A system for the transfer of information, which carries out a process comprising:
   generating at least one information signal (IS) which includes at least one reference component (BK) and at least one information component (I1; I2; . . . ; IN),
   causing at least one of the components to have a temporally continuous frequency change during the transfer,
   forming discrete states of the reference component (BK) and the information component (I1; I2; . . . ; IN) for the provision of a bit pattern, and
   transferring said at least one component with frequency change into constant intermediate frequencies,
   selecting the best suited signal components from the spectrum of the constant intermediate frequencies,
   separating the best suited signal components as constant frequencies from interference portions,
   evaluating the best suited signal components with regard to the relevant information parameters, and
   processing the information signal after reception, by separating the reference component (BK) from the at least one information component (I1; I2; . . . ; IN), wherein
      the reference component BK is transferred into a transformed reference component BK' and the at least one information component I1; I2; . . . ; IN is transferred into a transformed information component I1'; I2'; . . . ; IN'; and
      the signal parameters relevant for the information encoding are determined on the basis of the projection of I1'; I2'; . . . ; IN' onto the sine and cosine components of the BK' in each case,
   comprises a transmitter unit and a receiver unit, between which an information signal (IS) is transmitted, whereby
      the transmitter unit has a device for creating reference component (BK) and at least one information component (I1; I2; . . . ; IN), to generate temporally continuous frequency changes and to provide a bit pattern,
      the receiver unit contains a device for the acquisition of the information signal (IS) including at least one information component (I1; I2; . . . ; IN) and one reference component (BK), in which at least one component has a temporally continuous frequency change, and
   whereby the transmitter unit further comprises:
      at least one generator which provides the reference component (BK) and at least one information component;
      a first control module, which is connected to the generator and determines a frequency response;
      an encoder or a modulator connected to the control module for the conversion of the information by technical signaling means, and
      a mixer unit, which is connected downstream of the generator and the encoder or modulator.

21. A system according to claim 20, whereby the receiver unit has at least one input, one processing unit, and at least one output, and the processing unit contains in series a connector for separation and transformation of the signal components, for their transfer into standing intermediate frequencies, means for the separation or suppression of interference portions and means for the parameter analysis.

22. A system according to claim 20, in which the device for separation and transformation has at least one multiplicator, by means of which a pair-by-pair multiplication takes place of the at least one information component (I1; I2; . . . ; IN) with the reference component (BK), whereby the products form spectra of standing intermediate frequencies, from which downstream means for the suppression of interference portions, which feature at least one filter unit, which filters out the desired signal portions, which are then passed on to the downstream means for the parameter analysis.

23. A system according to claim 20, in which the device for separation also has a filter unit with a control module, which is connected upstream of the multiplicator and contains at least two filter elements in parallel connection, by means of which initially said at least one reference or information component is separated from the other signal portions.

24. A system according to claim 22, in which the device for the separation and transformation further has a unit, after the multiplicator provided for the processing in pairs of BK and IK, with a module for providing auxiliary frequencies, if appropriate with a further multiplicator, which, if appropriate, by means of initially still frequency-variable intermediate stages, causes a transfer of the signal components into pre-determined ranges of standing intermediate frequencies in each case.

25. A system according to claim 21, in which the device for separation and transformation has at least one multiplicator and at least one module for preparation of auxiliary frequencies in the form of one or more generators or a memory unit, capable of being called up, by means of which the reference and information components are transferred separately from one another into ranges of predetermined standing intermediate frequencies in each case, connected downstream of which are then means for the suppression of interference portions, which feature at least one filter unit, by means of which the desired signal portions are filtered out of the individual spectra of the standing intermediate frequencies in each case, and as such are purified of interference portions, and are then passed on to the downstream means for the parameter analysis.

26. A system according to claim 20, in which the device for frequency transformation further has at least one converter for Doppler compensation.

27. A system according to claim 20, in which the device for suppressing interference portions feature additional controllable filters.

28. A system according to claim 20, in which the device for the parameter analysis has at least one multiplicator for processing in pairs of one information-carrying signal component in each case with at least one reference oscillation, which is provided either system-internally by a generator or from a memory or by the reference component, and features an analysis module.

29. A system according to claim 20, which additionally has a device for tuning, which is connected downstream of the device for the frequency transformation and for preference is connected upstream of the device for the parameter analysis, a module for the analysis of frequency spectra, and an evaluation unit, and is connected to the module for the suppression of interference portions.

30. A system according to claim 20, which additionally has a module for Doppler analysis, which is connected to at least one of the generators of auxiliary frequencies and/or to a further evaluation module for the determination of the speed of the change of the distance between the transmitter unit and the receiver unit.

31. A transmitter unit, which is designed as part of a system for the transfer of information according to claim 20.

32. A receiver unit, which is a part of a system for the transfer of information according to claim 20.

33. A process for transferring information comprising:

generating at least one information signal (IS), including at least one reference component (BK) and at least one information component (I1; I2; . . . ; IN), temporally continuously changing frequency of at least one of the components during the transfer, forming discrete states of the reference component (BK) and the information component (I1; I2; . . . ; IN) for provision of a bit pattern, transferring said at least one component with frequency change into constant intermediate frequencies, wherein from a spectrum of the constant intermediate frequencies at least some signal components are selected, separated as constant frequencies from interference portions and portions and evaluated, processing the information signal after reception, by separating the reference component (BK) from the at least one information component (I1; I2; . . . ; IN), wherein the reference component BK is transferred into a transformed reference component BK' and the at least one information component I1; I2; . . . ; IN is transferred into a transformed information component I1'; I2'; . . . ; IN'; and the signal parameters relevant for the information encoding are determined on the basis of the projection of I1'; I2'; . . . ; IN' onto the sine and cosine components of the BK' in each case.

* * * * *